United States Patent
Sharma et al.

(10) Patent No.: US 10,664,946 B2
(45) Date of Patent: May 26, 2020

(54) SIGNAL PROCESSORS AND METHODS FOR ESTIMATING TRANSFORMATIONS BETWEEN SIGNALS WITH PHASE DEVIATION

(71) Applicant: Digimarc Corporation, Beaverton, OR (US)

(72) Inventors: Ravi K. Sharma, Portland, OR (US); John D. Lord, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 304 days.

(21) Appl. No.: 15/595,662

(22) Filed: May 15, 2017

(65) Prior Publication Data

US 2017/0345126 A1 Nov. 30, 2017

Related U.S. Application Data

(63) Continuation of application No. 14/301,293, filed on Jun. 10, 2014, now Pat. No. 9,652,821, which is a (Continued)

(51) Int. Cl.
*G06K 9/36* (2006.01)
*G06T 3/00* (2006.01)
(Continued)

(52) U.S. Cl.
CPC ............ *G06T 3/0056* (2013.01); *G06K 9/522* (2013.01); *G06K 9/6206* (2013.01);
(Continued)

(58) Field of Classification Search
CPC ... G06T 3/0056; G06T 1/0021; G06T 1/0064; G06T 2201/005; G06T 2201/0052;
(Continued)

(56) References Cited

U.S. PATENT DOCUMENTS

| 3,987,243 A | 10/1976 | Schwartz |
| 5,756,990 A | 5/1998 | Watkins |

(Continued)

FOREIGN PATENT DOCUMENTS

| CN | 1402586 A | 3/2003 |
| CN | 1526119 A | 9/2004 |

(Continued)

OTHER PUBLICATIONS

Chen et al., "A robust watermarking scheme using phase shift keying with the combination of amplitude boost and low amplitude block selection", Apr. 2005, Elsevier, Pattern Recognition, vol. 38, is. 4, p. 587-598 (Year: 2005).*

(Continued)

*Primary Examiner* — Vincent Rudolph
*Assistant Examiner* — Timothy Choi
(74) *Attorney, Agent, or Firm* — Digimarc Corporation

(57) ABSTRACT

A phase deviation method determines an offset between a reference and suspect signal by analyzing a phase deviation surface created by computing a deviation metric for phase shift and then analyzing a surface formed from the deviation metrics for an array of offsets. The phase deviation method analyzes the deviation surface to determine an offset that minimizes phase deviation. This method is applied at increasing levels of detail to refine the determination of the offset.

20 Claims, 13 Drawing Sheets

Related U.S. Application Data continuation-in-part of application No. 13/224,752, filed on Sep. 2, 2011, now Pat. No. 8,750,560.

(60) Provisional application No. 61/380,180, filed on Sep. 3, 2010.

(51) Int. Cl.
  *G06T 1/00* (2006.01)
  *G06K 9/62* (2006.01)
  *G06K 9/52* (2006.01)

(52) U.S. Cl.
  CPC .......... *G06T 1/0021* (2013.01); *G06T 1/0064* (2013.01); *G06T 2201/0065* (2013.01)

(58) Field of Classification Search
  CPC .... G06T 2201/0065; G06T 2201/0601; G06K 9/522; G06K 9/6206
  See application file for complete search history.

(56) References Cited

U.S. PATENT DOCUMENTS

| | | | | |
|---|---|---|---|---|
| 5,949,055 | A * | 9/1999 | Fleet | G06T 1/0028 235/454 |
| 6,408,082 | B1 * | 6/2002 | Rhoads | G06K 7/1417 382/100 |
| 6,525,302 | B2 | 2/2003 | Dowski, Jr. et al. | |
| 6,535,617 | B1 | 3/2003 | Hannigan | |
| 6,671,386 | B1 | 12/2003 | Shimizu et al. | |
| 7,313,249 | B2 | 12/2007 | Fletcher et al. | |
| 8,301,453 | B2 | 10/2012 | Sharma | |
| 8,750,560 | B2 * | 6/2014 | Sharma | G06T 1/0021 382/100 |
| 8,867,860 | B2 * | 10/2014 | Lyons | G06T 3/0006 382/276 |
| 9,182,778 | B2 * | 11/2015 | Sharma | G06K 9/6206 |
| 9,466,307 | B1 | 10/2016 | Sharma et al. | |
| 9,652,821 | B2 * | 5/2017 | Sharma | G06T 1/0064 |
| 9,836,807 | B2 * | 12/2017 | Lyons | G06T 3/0006 |
| 9,953,390 | B2 * | 4/2018 | Sharma | G06T 3/0056 |
| 10,402,929 | B2 * | 9/2019 | Sharma | G06F 1/02 |
| 2002/0106104 | A1 | 8/2002 | Brunk et al. | |
| 2002/0172396 | A1 | 11/2002 | Stach et al. | |
| 2003/0039376 | A1 * | 2/2003 | Stach | G06T 1/0028 382/100 |
| 2003/0072468 | A1 | 4/2003 | Brunk et al. | |
| 2003/0081810 | A1 | 5/2003 | Bradley | |
| 2003/0123698 | A1 * | 7/2003 | Murakami | G06T 1/0064 382/100 |
| 2003/0133589 | A1 | 7/2003 | Deguillaume et al. | |
| 2004/0001608 | A1 | 1/2004 | Rhoads | |
| 2004/0105569 | A1 * | 6/2004 | Sharma | G06T 1/0064 382/100 |
| 2004/0161108 | A1 * | 8/2004 | Ando | G06T 1/0021 380/201 |
| 2004/0250078 | A1 | 12/2004 | Stach et al. | |
| 2005/0111760 | A1 | 5/2005 | Lal | |
| 2006/0087458 | A1 | 4/2006 | Rodigast et al. | |
| 2006/0120583 | A1 | 6/2006 | Dewaele | |
| 2007/0092159 | A1 | 4/2007 | Larkin et al. | |
| 2007/0154061 | A1 | 7/2007 | Sharma | |
| 2007/0217652 | A1 | 9/2007 | Asano | |
| 2008/0199044 | A1 | 8/2008 | Tsurumi | |
| 2009/0174638 | A1 | 7/2009 | Brown | |
| 2009/0285446 | A1 | 11/2009 | Stach et al. | |
| 2010/0014705 | A1 | 1/2010 | Gustafson | |
| 2011/0044494 | A1 | 2/2011 | Bradley et al. | |
| 2012/0076435 | A1 | 3/2012 | Sharma et al. | |
| 2012/0078989 | A1 | 3/2012 | Sharma et al. | |
| 2012/0082398 | A1 | 4/2012 | Lyons et al. | |
| 2015/0106416 | A1 | 4/2015 | Lyons | |
| 2016/0132986 | A1 | 5/2016 | Sharma | |
| 2016/0188972 | A1 | 6/2016 | Lyons | |
| 2017/0193628 | A1 | 7/2017 | Sharma | |
| 2017/0345126 | A1 | 11/2017 | Sharma | |

FOREIGN PATENT DOCUMENTS

| | | |
|---|---|---|
| CN | 101060506 A | 10/2007 |
| CN | 101227440 A | 7/2008 |
| EP | 1173001 | 1/2002 |
| EP | 2612442 B1 | 7/2013 |
| EP | 3396621 A1 | 10/2018 |
| JP | 2008235964 | 10/2008 |
| JP | 2009290878 | 12/2009 |

OTHER PUBLICATIONS

Chen et al., "A robust watermarking scheme using phase shift keying with the combination of amplitude boost and low amplitude block selection", Apr. 2005, Elsevier, Pattern Recognition, vol. 38, iss. 4, p. 587-598.

Supplemental Search Report dated Nov. 10, 2015 in European Patent Application No. EP11822684.4.

Examination Report dated Sep. 27, 2016 in European Patent Application No. EP11822684.4.

Summons to Attend Oral Proceedings in European Application No. 11822684.4 dated May 22, 2017.

Fletcher et al., "Direct Embedding and Detection of RST Invariant Watermarks", Security in Communication Networks, Third International Conference, 2003, pp. 129-144.

Oltmans, "Secure Graphical Data Storage by Full Spectrum Image Coding", Proceedings of SPIE, vol. 6075, Feb. 2006.

First Office Action dated Aug. 5, 2015 in Chinese Patent Application No. 201180052657.7.

Lohmann, "Matched Filtering with Self-Luminous Objects", Mar. 1968, Applied Optics, vol. 7, iss. 3, p. 561-563.

Pereira et al., "Robust Template Matching for Affine Resistant Image Watermarks", Jun. 2000, IEEE Transactions on Image Processing, vol. 9, No. 6, p. 1123-1129.

O'Ruanaidh et al., "Rotation, scale and translation invariant spread spectrum digitalimage watermarking", May 28, 1998, Signal Processing, vol. 66, iss. 3, p. 303-317.

O'Ruanaidh et al., "Phase Watermarking of Digital Images", Sep. 19, 1996, IEEE Int. Conf. on Image Processing, 1996. Proceedings, vol. 3, p. 239-242.

Cox et al., "Secure Spread Spectrum Watermarking for Multimedia", Dec. 1997, IEEE Transactions on Image Processing, vol. 6, iss. 12, p. 1673-1687.

PCT/US11/50250 Search Report and Written Opinion dated Dec. 23, 2011.

Fitzgibbon, A. W., Pilu, M and Fischer, R. B.: "Direct least squares fitting of ellipses", Department of Artificial Intelligence, The University of Edinburgh, Jan. 1996.

Notice of Reasons for Rejection in JP2013527327, dated Apr. 5, 2016.

Holter, "The Optimal Weights of a Maximum Ratio Combiner using an Eigenfilter Approach", Norwegian University of Science and Technology Department of Telecommunications. 2002.

Macleod, "Fast Nearly ML Estimation of the Parameters of Real or Complex Single Tones or Resolved Multiple Tones", IEEE Transactions on Signal Processing, vol. 46, No. 1, Jan. 1998.

Quinn, "Estimation of Frequency, Amplitude, and Phase from the DFT of a Time Series", IEEE Transactions on Signal Processing, vol. 45, No. 3, Mar. 1997.

Quinn, Estimating Frequency by Interpolation Using Fourier Coefficients, May 1994.

U.S. Appl. No. 12/125,840, filed May 22, 2008.

Anonymous: "Orientation (geometry)—Wikipedia", Jul. 3, 2010 (Jul. 3, 2010), XP055365783, Retrieved from the Internet: URL:https://en.wikipedia.org/w/index.php?title=Orientation_(geometry)&oldid=3714 77791 [retrieved on Apr. 20, 2017], cited by the EPO in the above referenced Summons.

U.S. Appl. No. 14/825,014, filed Aug. 12, 2015.

(56) References Cited

OTHER PUBLICATIONS

Oct. 6, 2016 Office Action in U.S. Appl. No. 14/825,014, filed Aug. 12, 2015.
Mar. 28, 2017 Amendment in U.S. Appl. No. 14/825,014, filed Aug. 12, 2015.
Office Action dated Mar. 29, 2016, in CN201180052657.7.
Office Action dated Oct. 9, 2016 in CN201180052657.7.
Amended Claims for CN20118005657.7.
Examination Report dated Sep. 27, 2016 in EP11822684.4.
Machine translation of CN101227440 cited in Office Action dated Aug. 5, 2015 in Chinese Patent Application No. 201180052657.7.
Search Report dated Sep. 28, 2018 in European Patent Application No. EP18159735.2.
Chinese Office Action (with English language translation) for Application No. CN201711070330.8, dated Oct. 29, 2019, 17 pages.
Machine translation of CN1402586A cited in Office Action dated Aug. 5, 2015 in Chinese Patent Application No. 201180052657.7.

\* cited by examiner

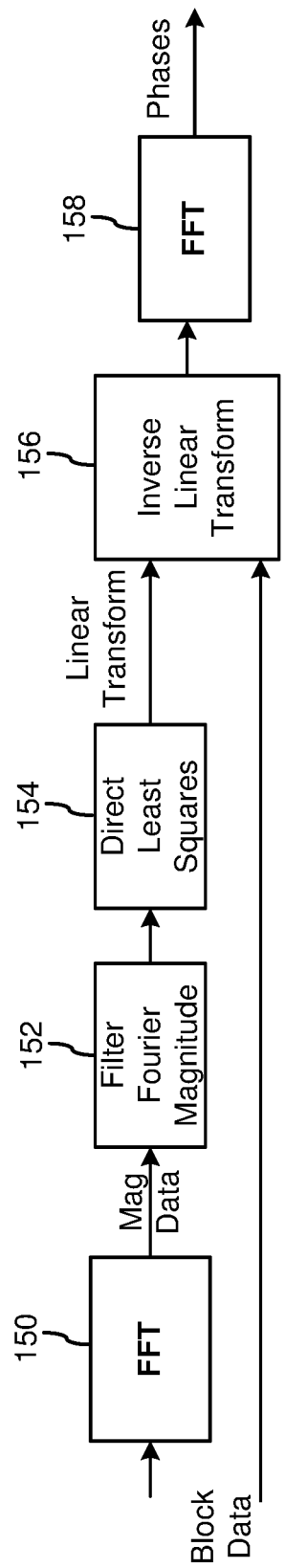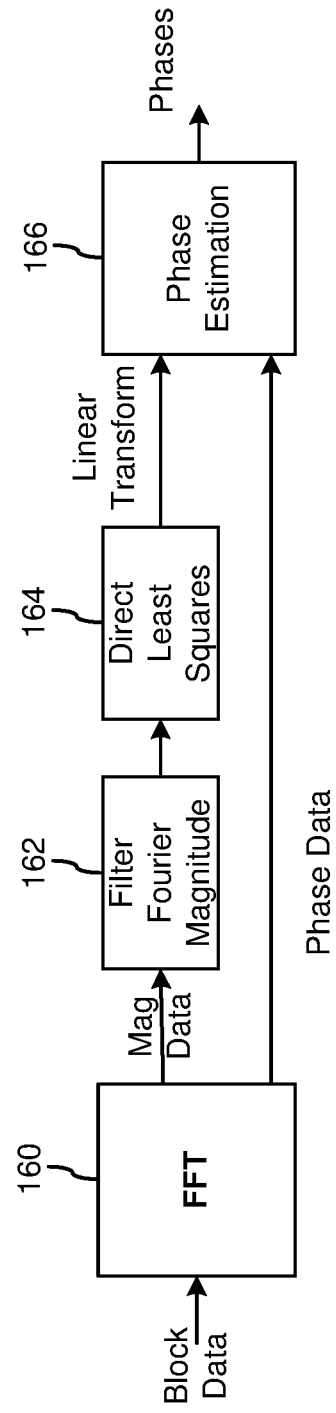
Fig. 5
Fig. 6

$$E_0[x_0, y_0] = \frac{1}{M} \sum_{i=1}^{M} \left\| e^{j(\theta'_i - \theta_i)} - e^{-j\frac{2\pi(u_i x_0 + v_i y_0)}{N}} \right\|^2$$

Deviation between Measured Phase Difference and Expected Phase Difference at Frequency $(u_i, v_i)$ for translation offset $(x_0, y_0)$ 2D Phase Deviation value at translation offset $(x_0, y_0)$ for zero-degree orientation Measured Phase Difference at Frequency $(u_i, v_i)$ Expected Phase Difference at Frequency $(u_i, v_i)$ for translation offset $(x_0, y_0)$ N = Support length of signal (e.g. 128)
M = Number of frequencies of interest (e.g. 64)
$x_0$ = horizontal translation offset ($x_0$ ranges from 0 to N-1)
$y_0$ = vertical translation offset ($y_0$ ranges from 0 to N-1)
$u_i$ = horizontal co-ordinate for the $i^{th}$ frequency of interest
$v_i$ = vertical co-ordinate for the $i^{th}$ frequency of interest
i = frequency index (i ranges from 1 to M)
$\|.\|^2$ = Euclidean distance measure
$E_0$ = 2D Phase Deviation surface for zero-degree orientation (for all values of $x_0$ and $y_0$)
$\theta'_i$ = phase angle at frequency i for the reference signal
$\theta_i$ = phase angle at frequency i for the suspect signal

Fig. 14

SIGNAL PROCESSORS AND METHODS FOR ESTIMATING TRANSFORMATIONS BETWEEN SIGNALS WITH PHASE DEVIATION

RELATED APPLICATION DATA

This application is a continuation of U.S. patent application Ser. No. 14/301,293, filed Jun. 10, 2014 (now U.S. Pat. No. 9,652,821) which is a continuation in part of U.S. patent application Ser. No. 13/224,752, filed Sep. 2, 2011 (now U.S. Pat. No. 8,750,560) which claims benefit of 61/380,180 filed Sep. 3, 2010. These patents and applications are hereby incorporated by reference in their entirety.

TECHNICAL FIELD

The invention relates to signal processing, and specifically signal processing for determining transformations between signals, for use in signal detection, identification, signal matching and recognition applications, among others.

BACKGROUND AND SUMMARY

There are a wide variety of signal processing applications in which the affine transformation between a suspect signal and a reference signal need to be computed accurately and efficiently. This is particularly the case for signal detection and recognition applications for images, and it applies to other types of signals as well. In the case of signal detection and signal recognition, the objective for the computing device is to determine whether a particular reference signal is present in a suspect signal. This objective is more difficult when the reference signal is present, yet is distorted by a transform of the coordinate space. In image processing, such transformations are caused by manipulation of the reference signal through image editing (magnification, shrinking, rotation, digital sampling (and re-sampling), format conversions, etc.). When the reference images or the objects they represent are captured via a camera from a different reference point relative to their original state, the result is a suspect image, which contains the reference signal, yet in a transformed state. Unless there is a means to determine and compensate for the affine transformation of the reference signal, it is more difficult to accurately detect, recognize or match the reference signal with its counterpart in the suspect image.

This signal processing problem is important to a variety of fields. Some examples include machine vision, medical imagery analysis, object and signal recognition, biometric signal analysis and matching (e.g., facial, voice, iris/retinal, fingerprint matching), surveillance applications, etc. In these applications, the objective may be to detect or match an input suspect signal with one particular reference signal, or match it with many different reference signals (such as in database searching in which a query includes a suspect signal (a probe or template) that is matched against a reference database of signals). Various types of images and sounds can be identified using signal recognition and detection techniques. These include recognition based on signal attributes that are an inherent in signals, as well as recognition based on signals particularly embedded in another signal to provide an auxiliary data carrying capacity, as in the case of machine readable codes like bar codes and digital watermarks.

In recent years, computing devices are becoming increasingly equipped with sensors of various kinds, including image and audio sensors. To give these devices the ability to interact with the world around them, they need to be able to recognize and identify signals that they capture through the sensors.

The advances of electronics have extended these advanced sensory functions beyond special purpose devices like machine vision equipment, surveillance and exploration equipment, and medical imaging tools, to consumer electronics devices, like personal computers and mobile telephone handsets. The signals captured in these devices are often distorted by transformations. If these transformations can be approximated by affine transformations or at least locally affine transformations, then it may be possible to determine the affine transformation (including local affine transform in a portion of the signal) that most closely matches the suspect with a reference signal.

The affine transformation that aligns a reference signal with its counterpart in a suspect signal can be expressed as $y=Ax+b$, where x and y are vectors representing the reference and transformed version of the reference signal, A is a linear transform matrix, and b is translation. The affine transformation generally comprises a linear transformation (rotation, scaling or shear) and translation (i.e. shift). The linear transformation matrix, for two dimensional signals, is a two by two matrix (2×2) of parameters that define rotation, scale and shear. The translation component is a two by one (2×1) matrix of parameters that define the horizontal and vertical shift. The translation is related to the phase shift as described in more detail below. Thus, the process of aligning two signals can include both approximations of the linear transform as well as the translation. The linear transform is sometimes approximated by determining signal correlation operations, which often employ Fourier transforms and inverse Fourier transforms. The translation component is approximated by determining phase shift (e.g., using signal correlation) in a Fourier representation.

When signal transforms are computed in digital computing environments of general purpose processing units or special purpose digital logic circuits, a number of challenges arise. Some of these challenges include the errors caused by representing signals in discrete digital logic. Not only is quantization error introduced as analog signals are sampled through sensors, but also as these signals are re-sampled when transformed into different coordinate spaces (e.g., Fourier and inverse Fourier transforms). Additional errors are introduced in the precision or limits on precision of the circuitry used to store the discrete values of the signal and associated transform parameters. Another challenge is that signal recognition and signal alignment typically involves transforms and inverse transforms, which in addition to introducing errors, are computationally expensive to implement in hardware, require additional memory, and introduce memory bandwidth constraints as the need for read/write operations to memory increases as each value in the discrete signal is transformed, re-sampled, or approximated from neighboring sample values.

In view of these challenges, there is a need for methods to determine transforms between signals that are accurate, yet efficient to implement in digital computing environments. This includes more effective ways to estimate linear transforms as well as determining translation or phase shift.

One aspect of this disclosure is a method of computing an estimate of an offset between a reference and suspect signal. This method operates on a set of phase estimates of a suspect signal (e.g., phases estimated from neighboring frequency coordinates as summarized below). For each element in an array of translation offsets, the method provides a set of expected phases of the reference signal at the translation offset. It computes a phase deviation metric for each of the set of expected and corresponding phase estimates at the translation offset, and computes a sum of the phase deviation metrics at the translation offset. This approach provides a phase deviation surface corresponding to the array of translation offsets. The method determines a peak in the phase deviation metrics for the array of translation offsets (e.g., in the phase deviation surface), wherein a location of the peak provides the estimate of the offset (e.g., translation or other linear transform offset).

Another aspect of the disclosure is a phase deviation circuit. The phase deviation circuit comprises a memory for storing a set of phase estimates of a suspect signal and known phases of a reference signal. It also comprises a phase deviation module for computing a phase deviation metric for each of the set of known phases of the reference signal and corresponding phase estimates from the reference signal for an array of offsets, and for computing a sum of the phase deviation metrics at the offsets. The circuit comprises a peak determination module for determining a peak in the phase deviation metrics for the array of offsets. The location of the peak provides the estimate of the offset between the reference and suspect signals.

In some embodiments, the phase deviation method uses estimates of phase derived from a method of computing an estimate of phase of a transformed signal. The phase estimation method provides a set of feature locations representing a discrete reference signal, receives a suspect signal, and applies a transform to the reference signal to provide a set of transformed locations. It samples phase from the suspect signal at discrete sample locations in a neighborhood around the transformed locations. To these sampled phases, the method applies a point spread function to provide an estimate of phase of the suspect signal at locations corresponding to the transformed locations.

Phase estimation is, for example, implemented in a digital logic circuit. This circuit comprising a memory for storing phase of a suspect signal and a transform module for transforming coordinates of a reference signal into transformed coordinate locations. The circuit also comprises a point spread function module for reading selected phase of the suspect signal from the memory at locations around a transformed coordinate location and applying a point spread function to the selected phase to provide an estimate phase.

In one embodiment, the above phase estimation and deviation methods are implemented along with a method of computing a transformation between a discrete reference signal and a suspect signal using a direct least squares technique. The method provides a set of feature locations representing the discrete reference signal, and provides a seed set of initial transform parameters. The feature locations and transform parameters are represented as digital, electronic signals in an electronic memory. Using the seed set, the method computes a least squares minimization that finds linear transform candidates that minimize error when the linear transforms are used to align the feature locations of the discrete reference signal and corresponding feature locations in the suspect signal. This includes computing a measure of correlation corresponding to the linear transform candidates. The method evaluates the linear transform candidates for each of the seeds to identify a subset of the candidates representing refined estimates of linear transform candidates.

This least squares method is implemented, for example, in a digital logic circuit. The circuit comprises a memory for storing a suspect signal representation. The circuit includes a correlation module for receiving a seed set of linear transform candidates and determining a correlation metric for each candidate as a measure of correlation between a reference signal and the suspect signal representation when the linear transform candidate is applied.

The circuit also includes a coordinate update module for determining feature locations within the suspect signal representation of a feature that corresponds to a feature of the reference signal at a location determined by applying the linear candidate transform. This module determines locations of components of a reference signal in the suspect signal and provides input to a least squares calculator to determine the transform between a reference signal and the suspect signal.

The circuit includes a least squares calculator for determining an updated linear transform for each of the candidates that provides a least squares fit between reference signal feature locations and the corresponding feature locations in the suspect signal determined by the coordinate update module. The circuit is implemented to use correlation metrics to identify the most promising linear transform candidates. For example, the circuit iterates through the process of updating the transform so long as the correlation metric shows signs of improvement in the transform's ability to align the reference and suspect signals.

One aspect of the invention is a method of determining a geometric transformation of a reference signal in an image. This method provides a linear transform candidate and transforms a reference signal with the linear transform candidate to determine locations within the image. It measures phases of the image at the locations to provide measured phase differences relative to known phases of the reference signal. For each of plural candidate offsets, this method obtains expected phase differences of the reference signal at the candidate offset, and computes phase deviations for expected and corresponding measured phase differences at the candidate offset. The phase deviation comprises a deviation between an expected and corresponding measured phase difference. The method computes a sum of the phase deviations at the candidate offset. Finally, the method searches the array of sums to find one or more offset candidates of the array that best approximate the geometric transformation of the reference signal in the image. Another aspect of the invention is a non-transitory computer readable medium, on which is stored instructions, which, when executed by one or more processors, perform this method.

Another aspect of the invention is a circuit comprising a linear transform estimation module for estimating a linear transform of a reference signal in an image, a transform coordinate module for transforming the reference signal with the linear transform candidate to determine locations within the image, and a phase estimation module for measuring phases of the image at the locations to provide measured phases. This circuit further comprises a phase deviation module for generating an array of phase deviation sums corresponding to the measured phases for each of a set of candidate offsets, the phase deviation sums each comprising a sum of deviations between measured phase differences and expected phase differences at a candidate offset, and a peak determination module for searching the array of sums to find one or more top offset candidates of the array that approximate the geometric transformation of the reference signal in the image.

The above-summarized methods are implemented in whole or in part as instructions (e.g., software or firmware for execution on one or more programmable processors), circuits, or a combination of circuits and instructions executed on programmable processors.

Further features will become apparent with reference to the following detailed description and accompanying drawings.

BRIEF DESCRIPTION OF THE DRAWINGS

FIG. 5 is a block diagram illustrating a method to compute estimates of the phases of a suspect signal for which an approximation of a linear transform has been computed.

FIG. 6 is a block diagram showing an alternative method to compute estimates of the phases of the suspect signal.

FIG. 14 is a diagram illustrating a phase deviation equation based on a deviation metric.

DETAILED DESCRIPTION

Figure 1:
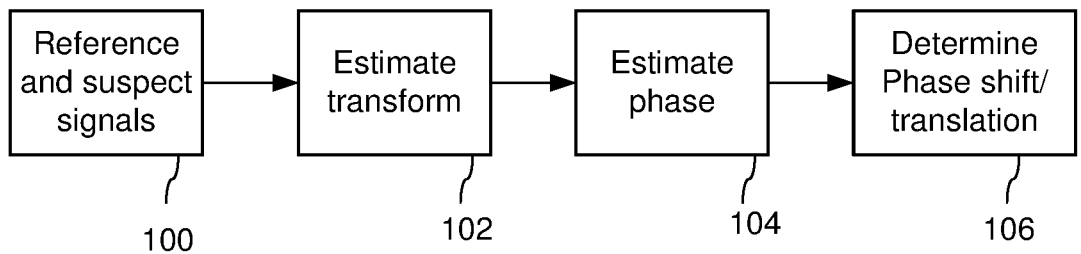
FIG. 1 is a block diagram illustrating an implementation of a process for determining a transformation between a reference and suspect signal.

FIG. 1 is a block diagram illustrating an implementation of a process for determining a transformation between a reference and suspect signal. We refer to this process as a transformation recovery process because it recovers a transformation of the reference signal from a suspect signal captured within a device. In particular, we have implemented this method to recover the transform required to align the suspect signal with the reference signal. The process takes as input a discrete representation of a known reference and the captured suspect signal 100 and determines an estimate of a transformation, which when applied to the reference signal, would approximate the suspect signal. The transformation recovery process is sub-divided into stages 102-106 in which the first stage provides an estimate of a transform (e.g., a linear transform described by 4-D vector of linear transform parameters (or 2 by 2 linear transform matrix)) and the subsequent stages refine the estimate by first estimating a phase (104) of the reference signal as transformed by an estimated transform of stage 102 and then finding the phase and the translation in stage 106 (thus, providing two additional parameters of translation). In our particular implementation, stage 102 provides candidate linear transforms, each corresponding to a 2 by 2 linear transform matrix. The next two stages provide two dimensional (2D) translation (in vertical and horizontal directions), which when combined with the 2 by 2 linear transform matrix, provide affine transform candidates. In this context, the phase shift and translation are related quantities that are expressed in different domains—the phase shift as a change in phase angle of signal components in a Frequency domain such as a Fourier transform domain, and translation in the spatial (e.g., the spatial domain of an image) or temporal domain (time domain of time varying signals like audio). Each of the stages 102-106 includes novel elements independent of the other stages, and we explain these novel elements in more detail. These stages are implemented in a system to compute an affine transform between signals and provide additional advantages when used in combination as explained further below. The methods and associated hardware implementations have application in a variety of signal detection and object recognition and matching applications. We illustrate examples of the methods in the context of digital watermark detection, but the methods are not limited to this context.

The methods also apply to a variety of signal types. They are designed to operate on two dimensional content signals captured from sensors (e.g., images or video frames captured with cameras). The methods also apply to one dimensional as well as 2 or more dimensional signals. One implementation, in particular, is adapted to determine the geometric transformation of a reference signal in image content. The reference signal is in the form of a two dimensional image watermark signal that is embedded in a host image. The reference signal can be generalized to encompass a variety of signal types for different applications. As such, the software and hardware implementations have applications in a variety of signal processing applications, such as object recognition, pattern recognition and matching, content fingerprinting, machine vision, and other applications where transformations between signals are computed. Our methods are particularly adapted for processing of signals captured in sensors, and in particular, image sensors like CCD and CMOS arrays, of the type used in digital scanners, cameras, mobile telephone handsets, etc.

Figure 2:
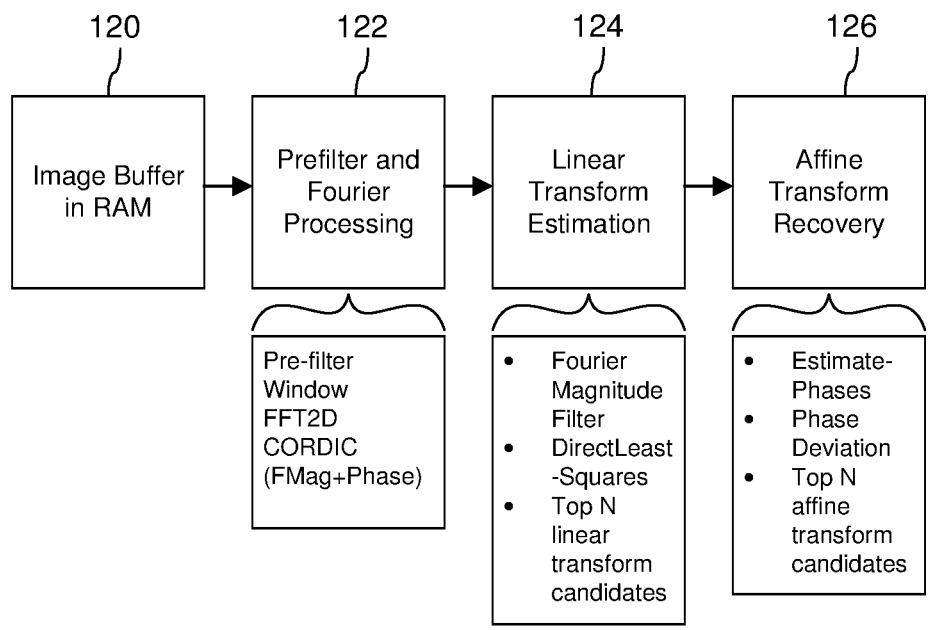
FIG. 2 is a diagram illustrating a hardware device that computes an affine transform between a reference and suspect signal.

As an example to provide context for the methods, we begin with an overview of watermark signal detection hardware. We then describe implementations of the individual stages. FIG. 2 is a diagram illustrating a hardware device that computes an affine transform between a reference and suspect signal. This particular design is adapted to recover the affine transform of an embedded two dimensional watermark signal. The design buffers portions of a captured and digitized electronic image in memory (RAM) 120 (the suspect image signal). A filter and Fourier transform processing module 122 filters the suspect image and computes a 2D Fourier transform. A linear transform estimation module 124 takes the discrete frequency representation of the suspect image and computes an estimate of a linear transform between a reference signal and the filtered suspect signal. Affine transform recovery module 126 uses the linear transform estimate, and reference and suspect signal representations to compute the phase/translation between the reference and suspect signal and so results in an affine transform which transforms the reference signal to the suspect signal.

The lower portion of FIG. 2 provides a break-down of sub-modules within modules 122-126. Implementations of these sub-modules are described further below.

The transform estimation of FIG. 1 can be implemented in a number of alternative ways. One approach is to perform a matched filter correlation between the reference and suspect signals. One such method for determining rotation and scale of a reference signal relative to a suspect signal is a Fourier-Mellin correlation. By converting both the suspect and reference signals to Fourier-Mellin coordinate space (a log polar coordinate space), the rotation and scale transform between the two signals is converted to translation shifts, enabling the application of matched filter correlation to find the location of a correlation peak, which corresponds to an estimate of the rotation and scale between the signals. Another is to perform a least squares method, and in particular, a direct least squares method. Below we describe implementations of least square methods. These are particularly useful for implementation in hardware, where the processing can be implemented in sequential pipelined hardware logic stages, and in software where the processing can be performed in parallel on special purpose hardware processing units such as, Graphics Processing Units (GPUs), Digital Signal Processors (DSPs) or multi core Central Processing Units (CPUs), to name a few.

Least Squares

Least Squares Technique

The least squares technique estimates a linear transform that yields the least square error (i.e., the maximum likelihood estimate), given an initial guess of the linear transform. Operations consist of multiplies and adds, and are hardware friendly.

Figure 3:
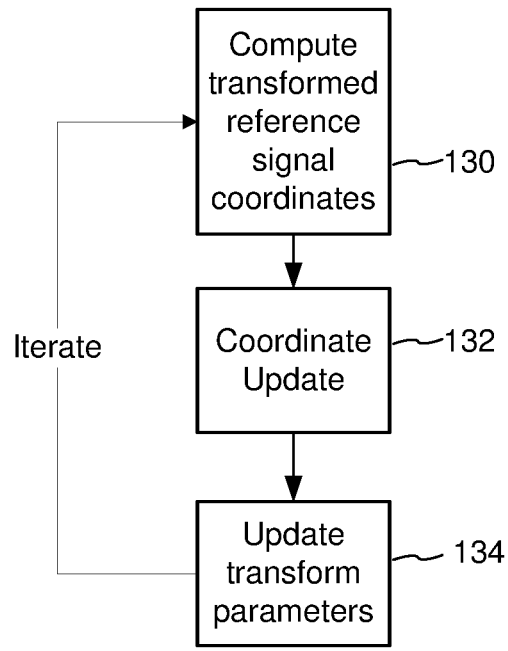
FIG. 3 is a flow diagram illustrating a least squares method that computes a best fit transform that aligns a reference signal with its counterpart in a suspect signal.

FIG. 3 is a flow diagram illustrating a least squares method. One implementation takes as input the coordinates for a set of reference locations (in either the frequency or spatial domain) and the corresponding set of coordinates for a set of transformed locations (again, either in the frequency or spatial domain). For the sake of illustration, we describe the technique for an implementation in which the reference locations correspond to features in the frequency domain, and in particular, peaks in the frequency domain.

This least squares method is performed iteratively and includes three steps for each iteration. These three steps are illustrated in FIG. 3 in processing blocks 130, 132, and 134:

Computation of transformed frequency coordinates 130—In this stage, the transformed frequency coordinates are computed using the initial transform and the original (i.e., non-transformed) frequency coordinates of the signal.

Coordinate update 132—in this step, more suitable locations for each transformed frequency is sought by searching the frequency magnitude plane for the peak value around a small neighborhood of the transformed frequency. At the end of this step, the coordinate of each transformed frequency is updated if a more suitable peak location is found for this frequency. The optimal frequency coordinates computed in this process result in locations that can no longer be simultaneously determined by a single linear transform.

Transform update 134—in this step, an updated linear transform is calculated from the updated coordinates using the least squares formulation. This updated transform is used as an initial guess for the next iteration. The least squares technique provides the transform that minimizes the squared error between the original and transformed coordinates. In particular, it provides the transform that minimizes, in the sense of least squared error, the sum of the location errors. The computation of the new transform from the errors is implemented as follows:

A measure of correlation, called correlation strength, is computed for each iteration. The correlation strength metric can be used to determine early termination of iterations or to provide regularization.

In theory, the least squares technique can find the actual linear transform between a reference and suspect signal starting from any initial guess of the linear transform parameters. However, from a practical standpoint (to prevent the coordinate update from being overly complex), the initial guess of the linear transform parameters must be somewhat close to the actual linear transform. Consequently, the technique is sensitive to the initial guess.

The initial guess of the transform can be as simple as a rotation and scale pair.

This least squares method can determine any arbitrary linear transform (i.e., including rotation, scale, shear, and, differential scale).

Direct Least Squares (DLS)

DLS is an efficient application of the least squares technique to determine the linear transform between a suspect and a reference signal. Our particular implementation applies to images, and in particular, the suspect image is a watermarked image, and the reference signal is a watermark signal, which is assumed to be embedded in the watermarked image. The task, in this case, is to determine the linear transform between the original reference signal, which is known, and its counterpart which is assumed to be embedded in the suspect signal.

In DLS, the least squares technique is applied to a sparse set of initial guesses of the linear transform.

DLS requires fewer evaluations than a Fourier-Mellin type correlation, while providing a more accurate transform than Fourier-Mellin. As noted above, a correlation between reference and suspect signals in the Fourier-Mellin domain provides an estimate of rotation and scale. Least squares, in contrast, can provide any arbitrary linear transform (e.g., a 4D vector of linear transform parameters).

With DLS, the 4-dimensional space covered by the 2×2 linear transform matrix can be evaluated extremely efficiently with initial guesses spanning a sparse 2-dimensional subspace.

Each DLS evaluation uses the least squares technique, and is independent of other DLS evaluations on the 2D subspace. Therefore, DLS evaluations can be performed efficiently in hardware or on multi-core processor architectures. Each evaluation results in an estimated linear transform and a corresponding correlation strength value. Candidate linear transforms are identified as those transforms corresponding to the largest correlation strength values. One or more of these candidate linear transforms are processed further to recover the affine transform.

DLS allows the initial guesses to be arbitrarily spread around the 2D subspace. For example, if the initial guesses comprise rotation/scale pairs, the spacing along the rotation axis and the scale axis can be arbitrary. In comparison, the Fourier-Mellin approach requires the spacing in the scale axis to be logarithmic. The use of arbitrary spacing has two advantages—increased robustness and efficient computation. In the general case, the set of initial guesses are ideally selected such that they are uniformly distributed over a sparse subset of rotation and scale values. For example, a uniform spacing in the scale axis (uniform increments in scale) can be efficiently computed and also reduces noise artifacts. The ability of DLS to converge on the appropriate linear transform and the accuracy of the estimated transform is influenced by the number of initial guesses and the number of least squares iterations. Optimal values for these parameters are determined as a tradeoff between hardware cost, computational speed and desired robustness. A more sophisticated strategy consists of using a very sparse set of initial guesses in conjunction with an adaptive number of iterations. More iterations are performed for cases where the resulting transforms from successive iterations exhibit convergence. This strategy provides computational efficiency without sacrificing robustness.

In certain applications, the suspect signal may undergo a limited set of transformations. For example, the rotation may be restricted to a range between −30 and +30 degrees. In such situations, DLS evaluations are performed on a further restricted range of sparse initial guesses.

Due to noise and distortion, the linear transform estimated by DLS can be noisy. In our particular case, the transform is noisy when estimated from a single image block of an image with weak watermark signal. To reduce the noise in the estimated transform, we take advantage of characteristics of the DLS output. Recall that DLS results in an estimated linear transform and a correlation strength value for each initial guess. For a well-designed set of initial guesses, multiple initial guesses lead to similar linear transforms. In other words, the output linear transforms are clustered. To reduce noise in the linear transform estimate, clusters of linear transforms are identified, and their elements appropriately averaged. Appropriate averaging can be done by weighting each linear transform by some function (e.g. nonlinear function) of the correlation strength.

Figure 4:
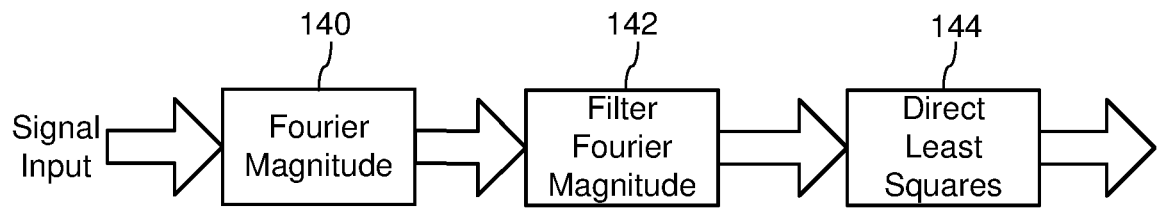
FIG. 4 is a block diagram of processing flow in a digital logic circuit implementation.

FIG. 4 is a block diagram of processing flow in a digital logic circuit implementation. A Fourier transform module 140 accesses the input signal (e.g., block of image data captured by an image sensor) from memory, and computes a Fourier transform and Fourier magnitude data. Fourier magnitude filter 142 filters the 2D Fourier magnitude data. One such filter is a non-linear filter that compares a sample value with each of its eight neighbors and replaces the sample value with an aggregate value based on these comparisons. In one implementation, the filter uses a ratio of the sample value to the average of its 8 neighbors (in the Fourier magnitude domain). The output of the filter is then a function (in this case, a nonlinear function) of this ratio. This filter is particularly useful in extracting reference signal features (e.g., in digital watermarking where the reference signal is embedded in the suspect signal). The output of the filter then forms the input to the direct least squares method (144).

Update Coordinates (Block 132 of FIG. 3)

The coordinate update process comprises a local search for a peak (or desired characteristic such as a corner or feature) around a small neighborhood surrounding the transformed location (frequency) of interest.

Neighborhoods are typically defined as a 3×3 or 2×2 region of samples or could be much larger depending on the problem domain and application.

If the peak or desired feature is in a different location than the transformed location, the coordinate of the transformed location is updated to this location The least squares method provides an estimate of the linear transform between the suspect and reference signals. To recover the complete affine transform, the phase shift (or the translation) between the two signals needs to be computed. One approach is to compute a phase correlation between a phase representation of both the reference and suspect signals, taking into account the linear transform. We have developed processing modules that are particularly advantageous in recovering the affine transform. These processing modules, as noted above in FIG. 1, are phase estimation and phase deviation.

Phase Estimation

Our phase estimation approach is advantageous because it calculates phases from the Fast Fourier Transform (FFT) of a transformed signal rather than performing the inverse transform of the image followed by an additional FFT to compute and extract the phases. Phase estimation uses the linear transform that the reference signal has undergone within the suspect signal. While direct least squares is illustrated as one method to compute this linear transform, there are other ways to compute it, such as using matched filters (e.g., the Fourier Mellin correlation to approximate the linear transform).

Highlighting this advantage, FIGS. 5 and 6 are block diagrams illustrating different methods of calculating phase information: one without phase estimation (FIG. 5) and the other with phase estimation (FIG. 6, 166). Both methods use direct least squares methods 154, 164 to estimate linear transforms between the signals. A first FFT 150, 160 is performed to obtain the magnitude information that the direct least squares technique operates on. As described for FIG. 4, a Fourier magnitude filter 152, 162 may be applied to the Fourier magnitude data. The approach of FIG. 6 uses our phase estimation technique, while FIG. 5 performs an inverse linear transform 156 followed by a second FFT 158 to calculate the phases. Phase estimation 166 avoids the extra processing of both the inverse linear transform 156 and the second FFT 158.

Figure 7:
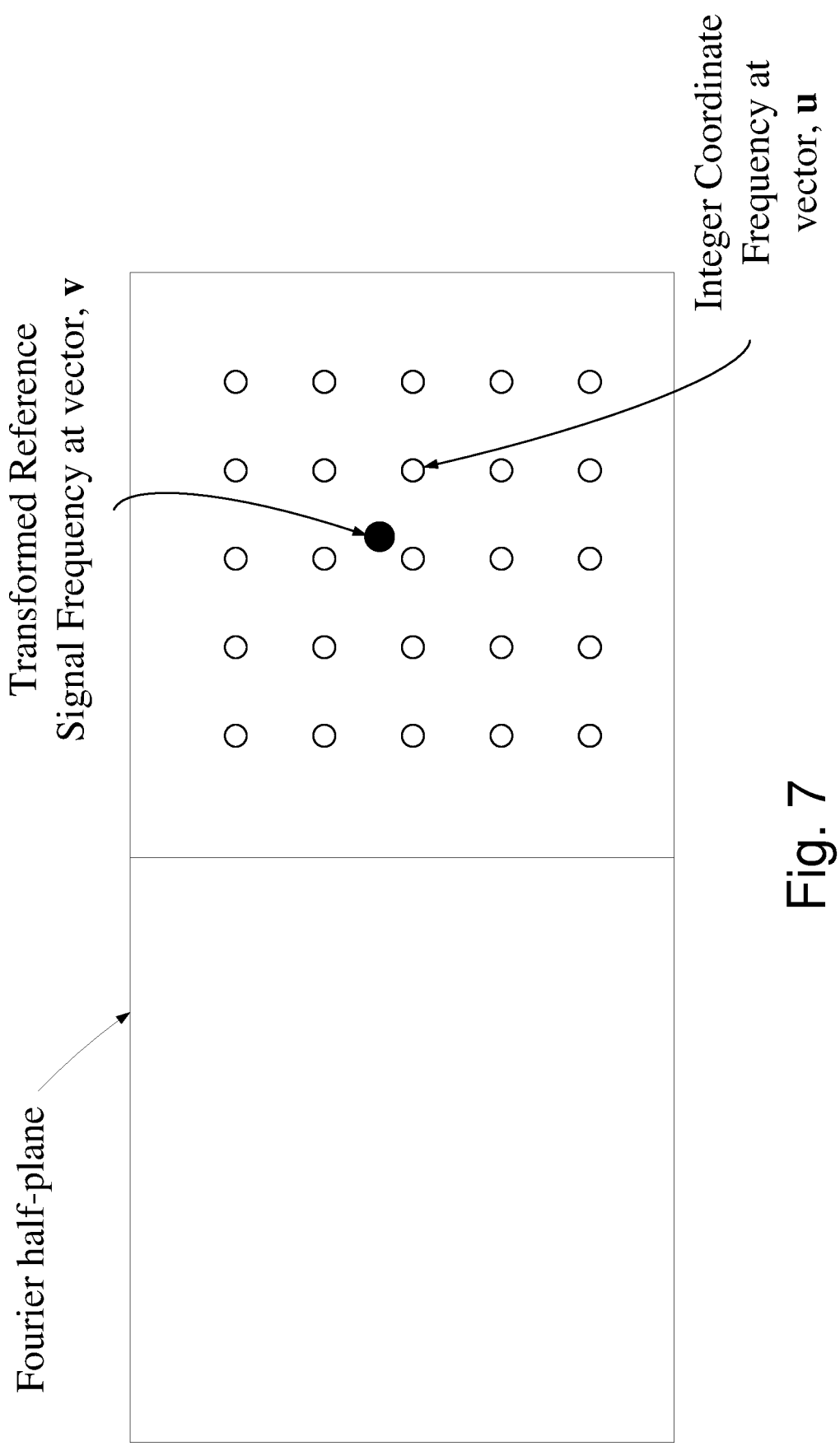
FIG. 7 is a diagram illustrating that the transformed frequency component of a discrete reference signal does not fall on integer coordinates in a Fourier domain, and as such, requires a phase estimation method to estimate phases from neighboring frequency locations.

FIG. 7 is a diagram illustrating the problem that phase estimation addresses. When the linear transform is applied to a reference signal coordinate, it likely does not map to a discrete coordinate. The phase estimation method provides an efficient approach to computing the phases at non-discrete (i.e., real valued) co-ordinate locations.

Figure 8:
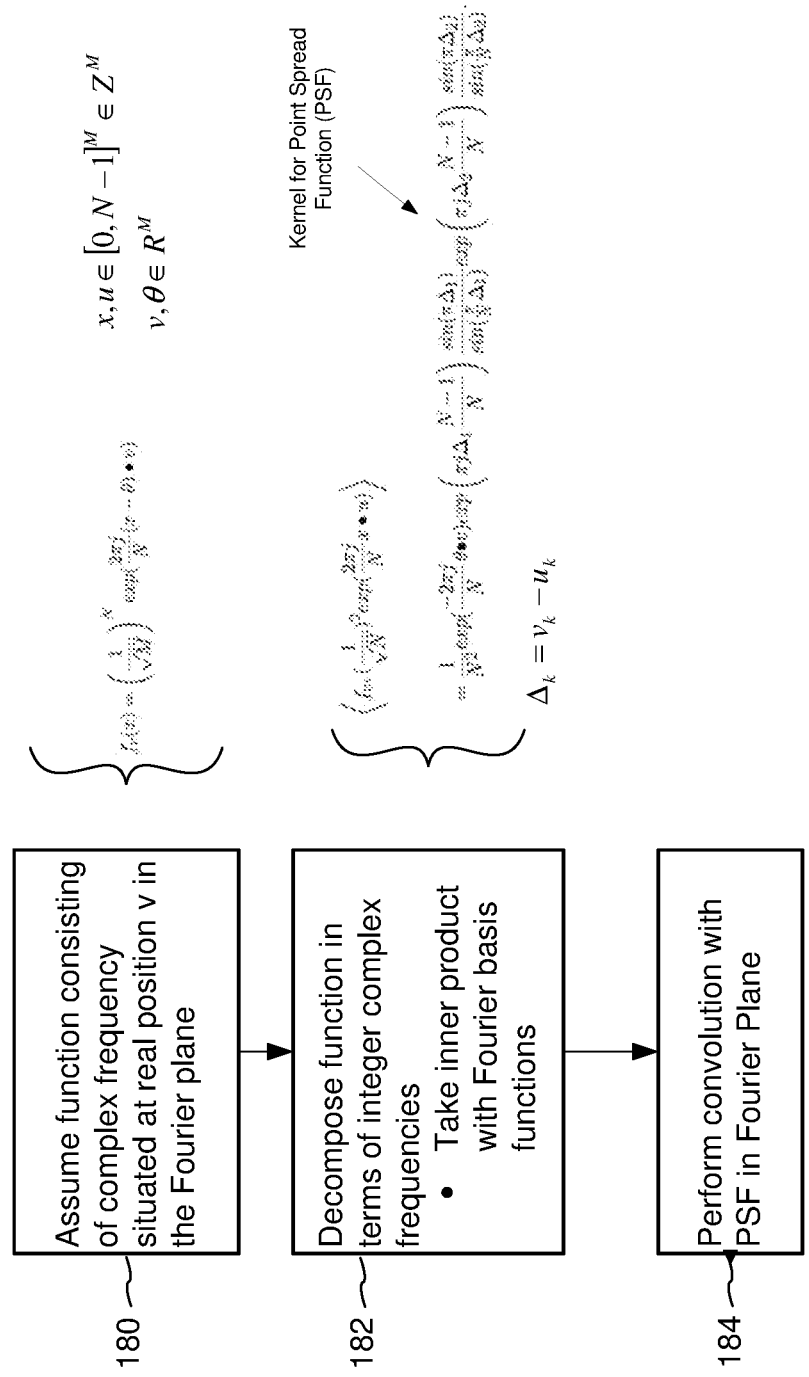
FIG. 8 is a diagram illustrating a process of deriving the phase estimation method and associated mathematics supporting the derivation.

To understand how phase estimation addresses the problem, we begin with a derivation of the phase estimation method. FIG. 8 is a diagram illustrating a process of deriving the phase estimation method and associated mathematics supporting the derivation. As illustrated in FIG. 7 and block 180 in FIG. 8, the first step in the derivation assumes a function consisting of complex frequency situated at real position v in the Fourier plane.

Block 182 of FIG. 8 and the corresponding mathematical expressions illustrate a derivation of a Point Spread Function (PSF) used for phase estimation. The PSF is derived by decomposing complex frequencies situated at real positions in the Fourier plane in terms of integer complex frequencies. This PSF is complex-valued.

As shown in block 184, the last step in the derivation performs a convolution with PSF in Fourier Plane. The inner product of block 182 of FIG. 8 is with respect to the Fourier basis functions—this provides the PSF. The PSF is then used in block 184 to convolve with the values in the Fourier plane.

Figure 9:
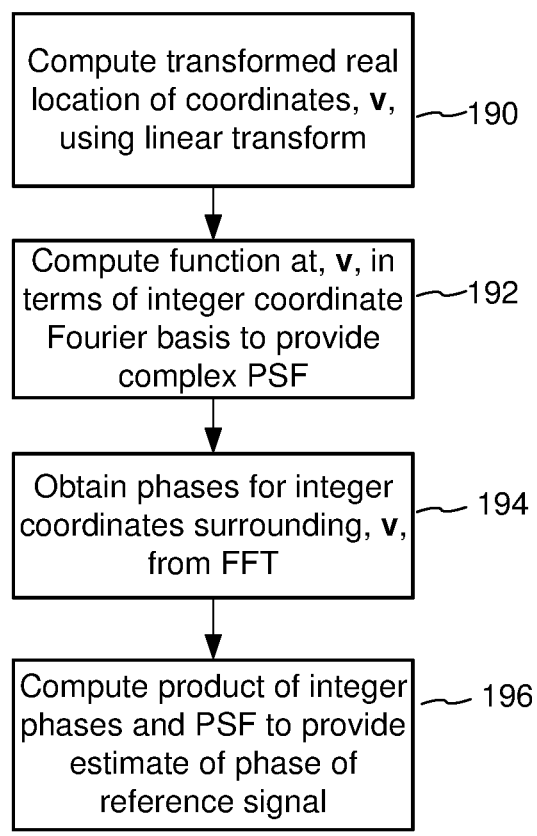
FIG. 9 is a flow diagram illustrating a phase estimation method to compute phases given a linear transform and a reference signal.

FIG. 9 is a flow diagram illustrating a phase estimation method to compute phases given a linear transform and a reference signal. There are two principal stages in our phase estimation process. In a first stage, the implementation transforms the known reference signal coordinates (in particular, a set of sinusoids at known frequency coordinates) according to a linear transform. In a second stage, the implementation uses the transformed coordinates and the phase information surrounding these coordinates in the suspect signal's frequency domain to obtain phase estimates of the transformed frequency coordinates. The inputs to this process are the discrete suspect signal, which is stored in memory in the form of a complex frequency plane from the 2D FFT, along with the assumed transform (e.g., the linear transform computed previously), and the reference signal's frequency specification (this is the set of known frequency locations of the sinusoids of the reference signal). For each real complex frequency, phase estimation applies the following steps a. Compute transformed real location (e.g., non-integral) of the frequency using the provided linear transform (block 190).

b. Express complex frequency at the real location in terms of integer-coordinate Fourier basis. This provides the complex PSF (block 192).

c. Obtain the phases for the integral frequencies surrounding the desired real frequency from the FFT of the suspect image block (block 194). The PSF is peaked at Delta=0, and so a non-integral peak shows up in a small neighborhood (as expected). In particular, the function (sin(pi Delta)/N sin(pi Delta/N)) has a peak at 0 (in the limit).

d. Compute the sum of products of the complex values at the integral frequencies with the corresponding complex values of the PSF (block 196). This gives the estimated phase at the real complex frequency.

The PSF values can be pre-computed and stored in a table for efficiency. In addition, the phases can also be quantized (to a few phase angles) for efficiency. The implementation of the first stage of phase estimation makes a transformation to move each frequency location of the reference signal to the appropriate "fractional" position between the discrete frequency samples. The characteristics of the transformed reference signal's phase are independent of the signal frequency. For each fractional frequency position, the PSF table contains pre-computed phase information for the nearest discrete frequency locations.

To simplify the computation, the implementation uses a limited resolution of the fractional frequency positions, between each integer frequency. The implementation uses this reduction in number of fractional frequency positions to further reduce the size of the PSF table. The PSF table contains pre-computed phase information only for each permitted fractional frequency position.

This PSF phase information is then re-used for all future estimations (in the 2nd stage of the process). In one particular implementation, the phase information is pre-computed and the values are stored in small discrete tables. The tables are the same for horizontal and vertical frequency directions, so the implementation accesses twice and combines the values to make the expected phase for a 2D frequency location.

Our phase estimation operations are efficient and hardware friendly. Besides eliminating the inverse transform and additional FFT, this approach does not require access to the suspect signal data (e.g., the input suspect image) as shown in the method of FIG. 5. Instead, it uses the frequency data of the suspect signal, which has already been computed, as shown in FIG. 6. Consequently, Phase estimation lends itself to a pipelined architecture in hardware.

In general, the phase estimation technique can be used to perform rotations or other transformations in the complex frequency domain, without first resorting to the spatial domain data.

Figure 10:
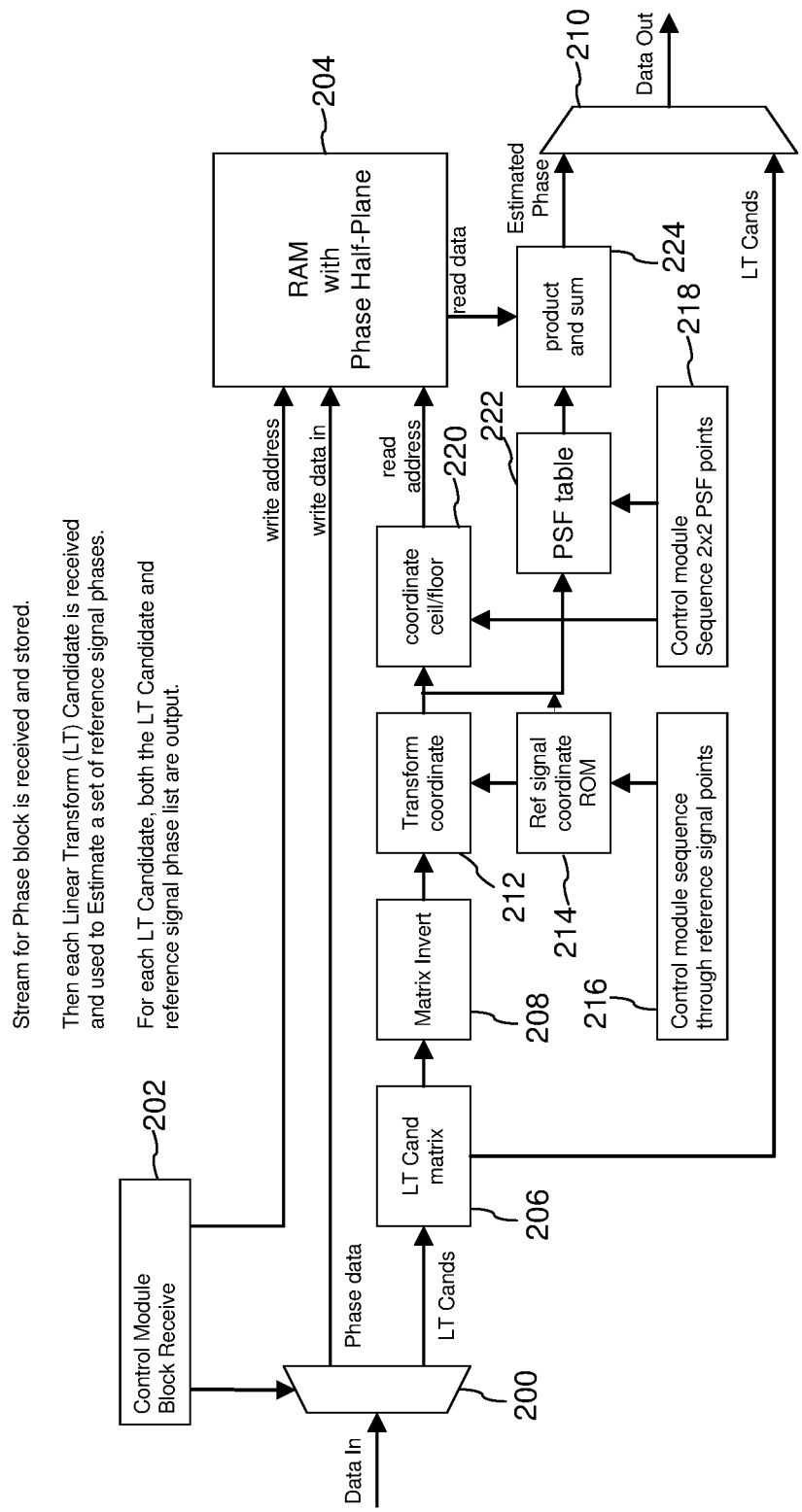
FIG. 10 is block diagram illustrating a digital logic circuit implementation of phase estimation.

FIG. 10 is a block diagram illustrating a digital logic circuit implementation of phase estimation. The phase estimation implementation shown in FIG. 10 receives a stream of phase information for a suspect signal block at data in module 200. Under control of control module 202, it stores the phase information (the phase half plane from a 2D FFT of the suspect signal block) in RAM memory 204. Linear transform candidates are also received through data in module 200 and stored directly in modules 206, 208 and 212 (alternatively, could be stored in RAM 204).

Linear transform candidate matrix module 206 forms the linear transform candidates in a matrix and provides them to a matrix invert module 208 and data out module 210. Matrix invert module 208 inverts the linear transform matrix. In this implementation, the linear transform is for a spatial transform of the image. For mapping the reference signal coordinates in the suspect image frequency domain, it takes the inverse transpose of the linear transform. Transform coordinate module 212 then takes a reference signal coordinate specifying the location of a reference signal component from a memory (Read Only Memory (ROM) 214) and transforms the location to a coordinate in the coordinate space of the suspect signal block. Control module 216 sequences through each of the locations of the reference signal components, providing the coordinates in the frequency domain. For each reference signal coordinate, control module 218 sequences through a 2 by 2 matrix of Point Spread Function (PSF) points. As it does so, it controls a coordinate ceiling/floor function module 220 that operates on the transformed coordinate of the reference signal component, and it selects the PSF for that coordinate in PSF table 222. The coordinate ceiling/floor module 220 then selects the neighboring frequency locations in the phase information RAM 204, which in turn, outputs the phase information at the neighboring locations to product and sum logic operators 224. The product and sum operators 224 apply the point spread function from table 222 to the phase information to calculate the estimated phase. Data out module 210 then outputs the estimated phases for each reference coordinate of the reference signal, along with the corresponding linear transform candidate. The phase estimation implementation cycles through all of the linear transform candidates, providing a set of estimated phases for each reference signal component for each LT candidate.

Phase Deviation

Referring back to FIG. 1, the process following phase estimation is to use this estimate of the phase of the transformed reference signal to determine the translation between the reference and suspect signals. There are alternative approaches to computing the translation at this point. One approach is to perform phase correlation between the phase representations of the transformed reference signal and the suspect signal (this requires an inverse FFT operation). Below, we describe an alternative approach referred to as phase deviation.

2D Phase Deviation

Phase deviation is an alternative approach to estimating the translation between two images or signals in general. As compared to a phase correlation approach, it does not require the inverse FFT operation.

Figure 11:
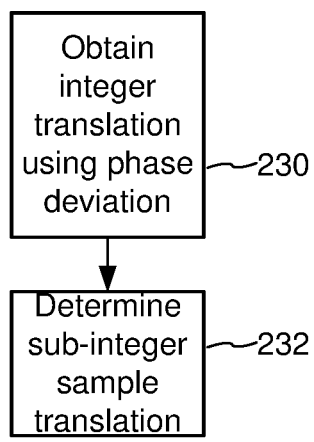
FIG. 11 is a flow diagram illustrating an overview of a phase deviation method.

FIG. 11 is a flow diagram illustrating an overview of a phase deviation method. The phase deviation method first obtains a set of candidate translation values (called the translation offsets) at a first level of detail (e.g., integer offsets) between the reference and suspect signals in step 230. In step 232 of FIG. 11, the phase deviation method refines these candidates by determining translation values that provide a better fit between the reference and suspect signals using a higher level of detail (e.g., fractional offsets) around the first set of candidate translations.

The phase deviation for a specified translation offset is the sum of deviations between the measured and the expected phases at all reference signal components of interest. In the case where the reference signal comprises a set of sinusoids, each with particular phase, the expected reference signal phases are the phases of the sinusoids at known translation offsets. These expected phases are provided for each of several translation offsets, which may be specified in terms of a phase angle or translation value (e.g., pixel offset at a particular image resolution). Stated another way, for each possible translation offset, there is a set of expected phases for the reference signal. Additionally, the other input is the measured phases, previously computed from the suspect signal. The deviation between the expected phases and the measured phases is computed for each translation offset. The deviation at each frequency can be calculated using a distance measure such as Euclidean distance between the measured and expected phases. The phase deviations calculated for all possible translation offsets constitute the 2D phase deviation surface. The location of the minimum value in the 2D phase deviation surface indicates the location of the translation offset.

A 2D phase deviation method can be implemented using just adds (no multiplies), and at a fraction of the computational cost of a 2D FFT. Also, the phase deviation calculations for each offset and for each frequency can be computed independently, leading to efficient parallel implementations. This is an advantage over alternative methods, like phase correlation.

The phase differences and deviations can either be computed as complex values or can be computed directly in terms of angles. Working with angles provides improved efficiencies in computation.

Distance measures other than the Euclidean distance can also be used. For example, the L1 norm or a nonlinear measure can provide improvements depending upon the specifics of the signals and noise involved.

In particular, the sum of deviations may be computed as the sum of absolute differences between the measured and expected phase angles, where each difference is wrapped between −pi and +pi, (modulo 2*pi). This computation is efficient to implement in hardware.

Sub-Sample Translation Estimation

Phase deviations can be computed for any arbitrary real valued translation offsets. This provides sub-sample translation estimation as opposed to integer valued translation estimation with the phase correlation approach.

The ability to compute a phase deviation metric at sub-sample translations can be used to implement a translation refinement technique where integer translations are first evaluated to determine suitable translation offsets around which further refinement is performed by evaluating sub-sample (i.e. fractional, sub-pixel for image content) translation offsets.

One Dimensional (1D) Phase Deviation

The basic phase deviation formulation can be modified to exploit patterns in the frequencies. Sets of frequencies for which the linear combination of coordinate values in one dimension (horizontal or vertical) is zero, lead to a 1D phase deviation formulation in the orthogonal dimension. Conceptually, this leads to hypothetical 1D signals in the orthogonal dimension which are a multiplication of the sets of 2D sinusoids in 2D space. The frequency of the hypothetical 1D signal is given by the sum of frequencies in the orthogonal dimension. Translation can then be estimated independently in each dimension using the 1D phase deviation formulation, for a fraction of the cost of 2D Phase Deviation. Besides, the search for a minimum phase deviation metric is along 1D (i.e. is on a one dimensional data set), further reducing the overall computational cost.

In some cases, the linear combinations lead to hypothetical 1D signals that are outside the support length (e.g. 128 points) of the original signal. These hypothetical 1D signals have a higher frequency than Nyquist. In this case, a 1D phase deviation method can be specified in terms of a larger artificial support length (e.g., using 256 points to ensure a higher sampling rate) to avoid aliasing. Avoiding aliasing increases reliability of translation estimation in noise.

1D phase deviation causes ambiguities in translation when all the resulting hypothetical frequencies in the orthogonal direction are even valued. For example, when pairs of quadrant symmetric frequencies of length 128×128 in 2D space (such as [−45, 9] and [45, 9], and, [−44, 6] and [44, 6]) are multiplied, the resulting 1D phase deviation has a periodicity of length 64. The frequency doubling caused by combining two frequencies of the same value leads to even valued 1D signal frequencies (e.g., 18 and 12), thereby introducing ambiguity. As a corollary to aliasing, mixing two frequencies A and B, produce new frequencies A+B and A−B. The ambiguity caused by periodicity can be resolved using 2D phase deviation for further evaluation of specific translations. Alternatively, the ambiguity can be avoided by ensuring that a substantial number (around half) of the hypothetical frequencies are odd valued.

A combination of 1D phase deviation and 2D phase deviation can be employed to take advantage of the meager computational load of 1D phase deviation and the robustness of 2D phase deviation.

Figure 12:
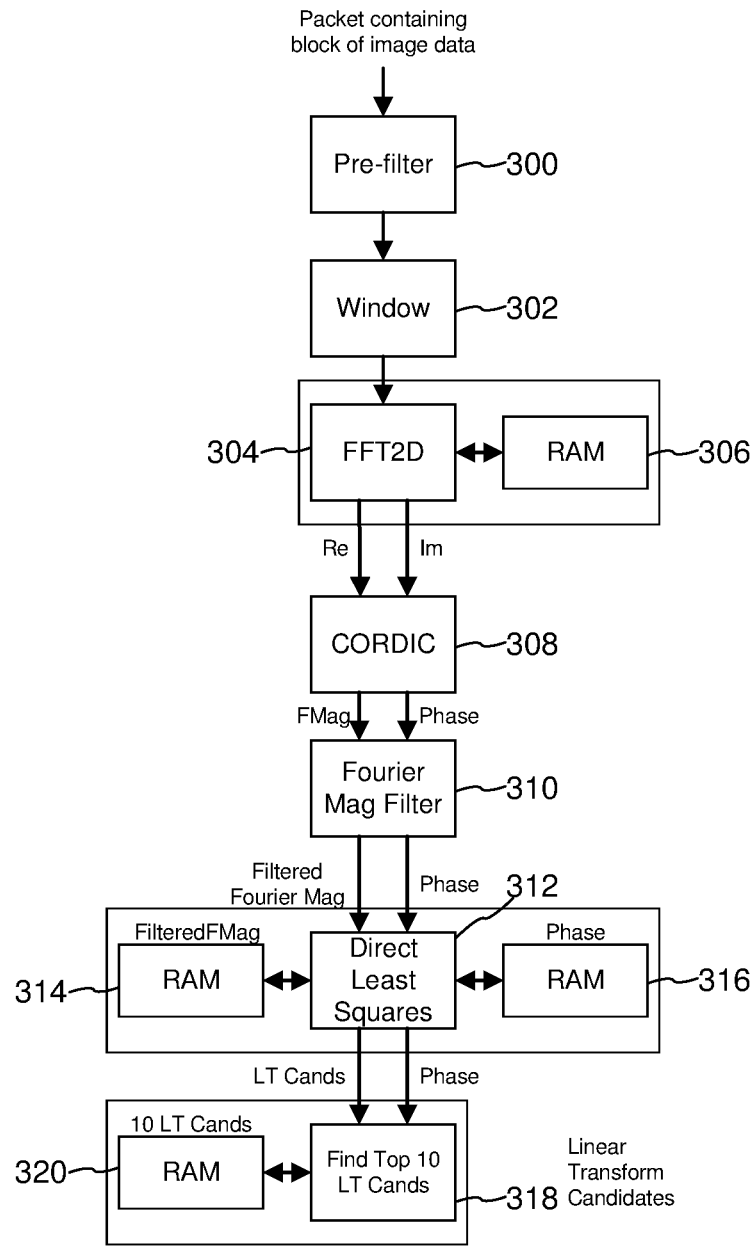
FIG. 12 is a block diagram of a digital logic circuit for estimating a linear transform.
Figure 13:
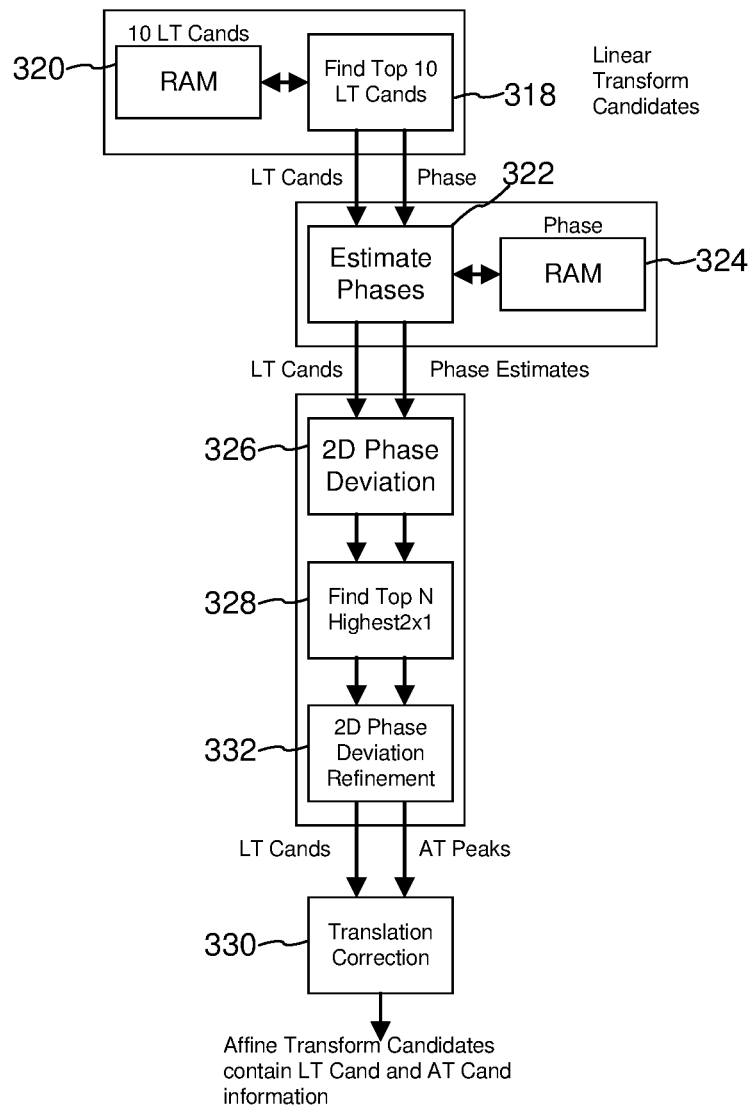
FIG. 13 is a block diagram of a digital logic circuit for phase estimation and phase deviation.

FIGS. 12 and 13 are block diagrams illustrating hardware implementations in more detail. FIG. 12 is a block diagram of a digital logic circuit for estimating a linear transform (e.g., block 102 in FIG. 1 and blocks 122-124 in FIG. 2). FIG. 13 is a block diagram of a digital logic circuit for phase estimation and phase deviation (e.g., blocks 102-104 in FIG. 1 and block 126 in FIG. 2).

As shown in FIG. 12, the input to the implementation is a packet of image data from the suspect image. The implementation computes the affine transform of a digital watermark signal embedded in the input image, which is the suspect image, relative to the initial coordinate space of the digital watermark, which is the reference signal. In this particular example, the reference signal is a set of frequency peaks corresponding to the watermark signal (namely, a set of sinusoids with a known, pseudorandom phase relative to each other). At this point in the process, the suspect image may have been subjected to various forms of distortion caused by sampling (scanning, printing, etc.) as well as geometric distortions (e.g., as a result of image editing and/or capture of the image in a transformed state from a scanner or camera). As a result of this distortion, the affine transform that best approximates the transformation between the known reference signal and its counterpart embedded in the suspect image is not known. The objective is to compute the affine transform that best approximates the transformation between the reference signal at the time of embedding, and the embedded reference signal within the suspect image.

Before describing the circuit implementation, it is helpful to provide background on the attributes of the reference and suspect signals because they dictate design considerations for the hardware. The digital watermark has been repeated within adjacent blocks (e.g., in a tiled fashion) of the signal. The digital hardware circuitry operates on a stream of input packets. The input packets comprise overlapping blocks of the suspect image that roughly correspond to the original size of the blocks into which the watermark was originally embedded. Each block is a 128 by 128 array of pixels. The size of memory and FFT filters etc. are adapted based on these signal attributes, and can vary with the application and signal specifications for those applications.

The pre-filter 300 filters the pixel values within the image block using the method described previously. Namely, each sample is compared with its eight neighbors and replaced by a value that is a function of these comparisons to provide a form of non-linear filtering that seeks to isolate the embedded reference signal from the suspect image data.

The window operation 302 prepares the filtered image data for a 2D FFT. The resulting filtered image data block is received by FFT2D (304) and stored in RAM. In this case, the RAM (306) is implemented within an ASIC along with the other hardware components shown in FIG. 12. FFT2D processes a block of spatial input data to produce complex frequency data. The Real and Imaginary parts of complex frequency data are interleaved in output into a single pipe output stream.

CORDIC 308 converts interleaved Real (Re) and Imaginary (Im) stream into interleaved magnitude and phase stream. As known in the field, CORDIC is a method for efficient digital signal processing implementation of trigonometric functions. A Fourier Magnitude Filter 310 filters only the Fourier Magnitude portion of the data. The filter uses a ratio of the sample value to the average of its 8 neighbors (in the Fourier magnitude domain). The output of the filter is then a function (in this case, a nonlinear function) of this ratio. The phase is passed through un-altered.

The Direct Least Squares (DLS) module 312 receives an interleaved stream of the Filtered Fourier Magnitude and Phase data. Each of these data streams is stored in a RAM, shown as RAM blocks 314 and 316.

DLS computes and refines each potential linear transform candidate for maximum correlation strength. The output of the DLS module 312 is a stream of linear transform (LT) candidates, preceded by the stored phase block. Phase data used for phase estimation is stored in a form that is ready to be sampled so that phases can be estimated for each candidate linear transform.

Block 318 sorts the input stream of linear transform candidates to find the top 10 candidates, based on a measure of correlation. This measure of correlation, in this implementation, is a correlation strength computed as the dot product between the reference and suspect signals after the linear transform candidate is used to align these signals. RAM 320 is a memory used to store the top linear transform candidates and corresponding correlation metrics.

FIG. 13 starts where FIG. 12 ends with the top linear transform candidates. The phase estimation module 322 receives the stream of phase data and stores it in RAM 324. It uses each of the linear transform candidates to estimate a set of phases for signal components in the suspect image corresponding to each of the frequency locations in the reference signal. For each linear transform candidate, the phase estimation module provides both the linear transform candidate and a set of phases corresponding to the frequency locations in the reference signal. These phases represent a measure of the phases of the reference signal component that is embedded in the suspect signal. In particular, for this implementation where the reference signal is embedded into the suspect signal as a digital watermark, the set of phases represent the estimates of the phases of the embedded reference signal components, which correspond to sinusoids with random phase.

In other implementations, the phase estimation module may be subsumed within the DLS module, since much of the matrix calculations to transform reference signal coordinates are already computed there, and the phase data is also readily available. This will result in the DLS module outputting both linear transforms and estimated phases for each of those transforms.

While the phase estimation method is depicted for a digital watermark detector implementation, the method is applicable to other applications where a signal processor seeks to find a known reference signal within a suspect signal. Examples include object recognition and pattern matching, where the signal processor seeks to find a known reference signal in an image. The phase estimation method enables the signal processor to compute estimates of the phase of a reference signal that is suspected to be a component of the suspect image. These phase estimates can then be used in additional matching or recognition operations to detect whether the reference signal is present in the suspect signal. In these methods, the same general approach is followed: the phase estimation uses an estimate of the transform between an expected signal pattern and corresponding components in a suspect signal, along with the phase of the suspect signal to compute estimates of the phase of the signal pattern in the suspect image.

Returning to FIG. 13, the phase deviation module 326 receives each linear transform candidate and a corresponding set of estimated phases of the reference signal in the suspect signal. The phase deviation module 326 computes a phase deviation surface for each linear transform candidate. This surface is an array of phase deviations, where each element in the array corresponds to a translation offset and the value of the element is sum of phase deviation metrics between corresponding expected and measured phase differences. For 2D phase deviation, this is a 2D array of phase deviation values corresponding to all pairs of translation offsets (e.g., a surface of 128 by 128 values). As described previously, the phase deviation for a particular translation offset is computed as a sum of a difference metric that calculates the deviation between an expected phase difference and the measured phase difference at a particular reference signal component. For our implementation, there are four orientations for each linear transform candidate, corresponding to orientations of 0, 90, 180 and 270 degrees. At the end of computing the phase deviation surface for an orientation, phase registers are re-oriented by 90 degrees.

The objective of the 2D phase deviation module is to provide one or more translation offset candidates corresponding to minima in phase deviation. Stated another way, the objective is to find the translation offset that best matches the expected and measured phase differences, as determined by the minimum deviation between the two. The implementation subtracts the phase deviation from a large constant to convert the problem of searching for minima to a problem of searching for peaks for convenience (in this case, a peak represents a minimum phase deviation metric in the phase deviation surface). Since the objective is to find the best matches between the expected and measured signals (i.e. the known reference signal and its counterpart in the suspect image), the hardware seeks to find peaks in the deviation between the two. The initial 2D phase deviation surface is computed for integer translation offsets for computational efficiency. However, the actual translation might lie at a fractional (i.e., sub-pixel) offset. As a result, peaks in the inverted phase deviation surface might be spread over a 2 by 1 pixel region (in either the horizontal or vertical direction).

To overcome this effect, peaks are searched over 2×1 regions in the Highest2×1 module 328.

To overcome the effects of noise and distortion, the top N peak candidates are further evaluated using a refinement module 332.

The refinement module begins with the top N peaks (e.g., 2 by 1) peaks identified in the inverted 2D phase deviation surface (e.g., the greatest minimum in magnitude in the phase deviation surface). The value of N is determined as a tradeoff between computational efficiency and robustness and is typically between 2 and 10. Then, for each of these N peaks, it computes a refined phase deviation surface in a neighborhood around the translation offset corresponding to the peak. These refined phase deviations are computed for sub-pixel translation offsets. In particular, the expected phase differences are computed for each of the sub-pixel translations in a M by M array around the integer translation offset location of a peak. The value of M and the fractional (i.e., sub-pixel) increments in translation are determined based on the desired computational throughput and robustness. A typical value for M is 16, while a typical fractional increment is a quarter pixel. The sum of phase deviations is calculated to provide the sub-pixel phase deviation surface. If there is a sub-pixel offset with a higher peak, this sub-pixel offset is included in a list of the top peaks.

The output of the 2D phase deviation module is a linear transform candidate followed by a list of peak coordinates corresponding to minima in the phase deviation surface (including any surfaces computed in the refinement stage).

The translation correction module 330 corrects the translation offset computed for each of the linear transform candidates. The nature of the correction is specific to the implementation and depends on implementation details such as, whether the reference signal phases used as inputs are expressed relative to Fourier representation block center or block corner, and Fourier processing and representation relative to block center or corner, as well as differences in the translation depending whether it is represented relative to the coordinate system of the transformed suspect signal or the reference signal.

FIG. 14 is a diagram illustrating a phase deviation equation based on a deviation metric. This diagram provides an example of a phase deviation metric. This metric is one example illustrating how to compute phase deviation values in the phase deviation surface. As shown in FIG. 14, phase deviation represents the deviation between a measured phase difference and expected phase difference for a particular frequency component, i, of the reference signal. The measured phase difference is the difference between the phase angle at frequency component, i, for the estimated phase of the reference signal in the suspect signal (e.g., as determined by the phase estimation process) and the known phase angle of the reference signal component. As noted previously, the phase estimation process provides a phase angle estimate for the suspect signal in the transformed state. In the implementation, the phase angle used for the known reference signal is in its original, un-transformed state.

The expected phase difference is directly computed from the horizontal and vertical translation offsets. As noted, these offsets start out as integer offsets, and then are sub-integer (e.g., sub-pixel) for refinement.

Note that in the equation that there are M frequency components in the reference signal. The deviation metric is a sum of the individual deviations for each of the frequency components. While the Euclidian distance measure is shown, other deviation metrics may be used as previously indicated.

From the depiction in FIG. 14, one can see that the 2D case shown can be reduced to 2 separate instances of 1D phase deviation by using a reference signal that has pairs of frequency components that are symmetric about the vertical axis, and thus, the horizontal components cancel each other, and likewise, have pairs of frequency components that are symmetric about the horizontal axis, and thus, the vertical components cancel each other. As noted, this enables the vertical and horizontal translation offsets to be determined separately in independent searches for the peak in the respective 1D phase deviation arrays.

Figure 15:
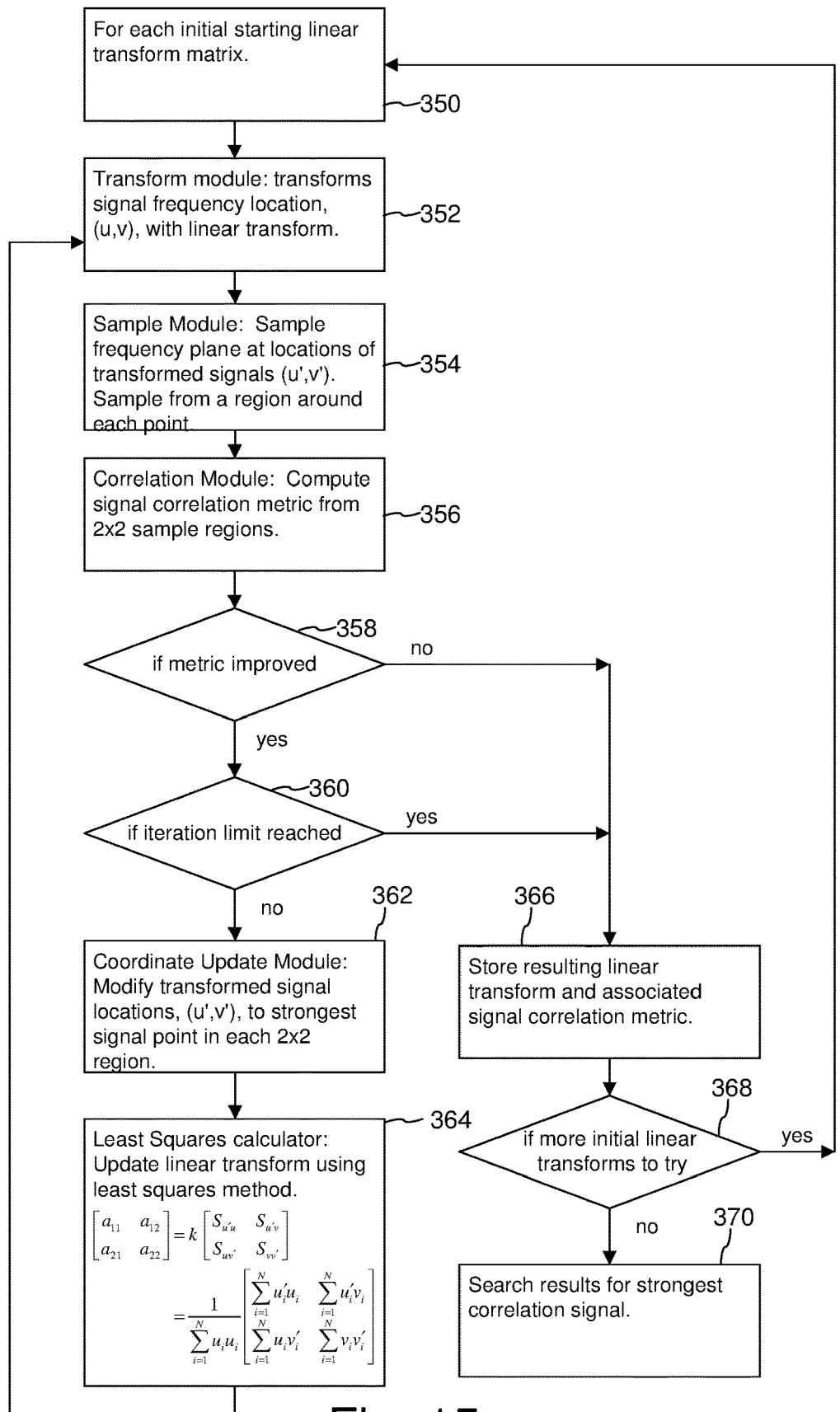
FIG. 15 is a diagram illustrating an implementation of a direct least squares method.

FIG. 15 is a diagram illustrating an implementation of a DLS method. This is an implementation of the processing within, for example, block 312, in FIG. 12. As noted previously, the DLS module begins with a set of seed linear transform candidates in block 350. For example, this implementation begins with a sparse set of rotation-scale candidates (as noted in one example above), which comprise subset of the linear transform parameters represented in a 2 by 2 linear transform matrix. The other linear transform parameters represented in a 2 by 2 matrix include differential scale (e.g., horizontal and vertical scales) and shear (e.g., horizontal and vertical shear). When the DLS method starts with rotation and scale candidates, the other parameters are initially assumed to not provide any additional transformation, and subsequent iterations of the method update the linear transform in a manner that enables the other linear transform parameters to vary so as to provide a better fit between the reference and suspect signal. In other implementations, a different subset or formulation of sparse linear transform candidates may be chosen as seed candidates.

For each linear transform candidate in the starting set of seed candidates, a transform module in the DLS module transforms the frequency locations of the frequency components in the reference signal (352). A sample module then samples the frequency plane of the suspect signal at locations in a neighborhood around the location of each transformed location (354). The neighborhood is a region surrounding the transformed frequency location, and in practice it encompasses some number of discrete frequency locations in the FFT of the suspect signal. Next, a correlation module in the DLS module computes a signal correlation metric (356) that provides a measure of correlation between the reference signal and the suspect signal for these regions in the suspect signal around each transformed component of the reference signal. At the end of this process, the DLS module has a signal correlation metric for the linear transform candidate. It determines whether this metric is improved relative to a previously stored metric for a prior iteration (358). The DLS module continues so long as there is improvement in the correlation metric (358) and an iteration limit is not met (360).

There are a variety of ways to compute regions and the signal correlation metric computed for those regions. In one implementation in which the DLS module samples from the four nearest neighbor locations, the signal correlation metric is computed as a sum of the bi-linear interpolation of the frequency magnitudes at those neighbors for each transformed location within the suspect signal. Alternatives include computing correlation using a bi-cubic interpolation, and using a 3 by 3 sample region around each transformed frequency component's location. The correlation can also incorporate a correlation of the phase components of the reference and suspect signals at the regions. In this case, the phases in the suspect signal are estimated using the phase estimation method.

In the case where the DLS module finds a linear transform candidate that improves upon the signal correlation and is below the iteration limit, the DLS module proceeds to establish a set of inputs to a least squares calculator, which in turn, computes a new candidate linear transform. This set of inputs comprises a set of frequency component locations corresponding to each transformed frequency component location, where there is a maximum in frequency magnitude. The process of finding these new locations for each component of the reference signal is reflected in block 362. In particular, a coordinate update module computes feature coordinates (e.g., peaks) in a neighborhood around the transformed coordinate locations. Next, the least squares calculator (364) computes a new linear transform candidate by using the least squares method to find a linear transform that best maps the reference signal components from their original locations to the new locations found in block 362.

The process depicted in block 362 is an implementation of "Coordinate Update" discussed above. One approach to updating the coordinates of a frequency component of the reference signal is to select the coordinates of the neighboring frequency location with the maximum magnitude in a neighboring region, such as a 2 by 2, 3 by 3, 5 by 5, etc. sample region around the transformed frequency location. This process does not require interpolation to find new coordinates. In some implementations, we have found that a 3 by 3 neighborhood covers differential scale up to 2-3% and sometimes up to 5%. There is a trade-off between using a larger neighborhood and potential confusion due to noise of adjacent frequency components of the reference signal. Our implementations use a reference signal where M is in the range of 35-75, the suspect image is sampled around a resolution of 100 dots per inch (DPI), and the block size and FFT size is 128 by 128 samples. The neighborhood sizes and shapes can be tailored for the unique characteristics of the reference signal. Neighborhood sizes can increase with increasing frequency. The neighborhood size and shape can be tailored to avoid conflict of noise due to adjacent frequency components in the reference signal. The neighborhood size and shape can also be adapted as a function of the linear transform candidate (e.g., transformed by the LT candidate). The update to the coordinate of a transformed location can also be computed as combination of neighboring values, such as by finding the center of a neighboring peak (e.g., a Normalized Center of Mass), a Center of Mass, a quadratic fit, or other interpolation of neighboring values.

The least squares calculator of block 364 implements the expression shown in the diagram to solve for the 2 by 2 linear equation on the left hand side of the expression. This is implemented in hardware using multiply and add logic circuitry, and of course, can be implemented in software (including firmware instructions). As shown, the inputs are the coordinates of the reference signal components and the corresponding updated coordinates for the reference signal in the suspect signal as determined from the previous block (362).

After computing the update of the linear transform candidate in block 364, the DLS modules adds this linear transform as a new candidate and returns to block 352.

When the DLS module completes as determined in decision blocks 358-360, the resulting linear transform candidate and its associated signal correlation metric are stored for further processing (366). The DLS module repeats for additional seed linear transform candidates as shown in block 368. When the initial candidates have been processed and refined as shown, the DLS module has a refined linear transform candidate for each initial seed candidate. It searches this set of refined linear transform candidates for the strongest correlation (370). A subset of the top candidates based on correlation can then be used in further processing as noted. Also, as noted previously, linear transform candidates can be clustered and combined to form new linear transform candidates.

Phase Deviation Applications

The phase-deviation metric can be used as a gate for false-positives in signal recognition or detection methods. In its simplest form, the signal detector acts a classifier distinguishing signal present from signal absent. The phase deviation metric distributions are determined from sets of signals for each class, and then a threshold is derived distinguishing the two classes. Then in operation of the detector, it computes the phase deviation metric for a suspect signal, evaluates it relative to the threshold to classify it, and outputs a result (e.g., signal present or not).

One embodiment of this method is as follows. The phase-deviation metric is computed from the sum of the absolute differences of the reference phases and the measured phases. When the translation is incorrect, the phase-deviation metric is approximately equal to (number_of_reference_signals*pi/2). This produces a noise-floor during the search around this value. When, during the search process, the translation is aligned correctly, and if the measured phases are all correct (no noise or other content interfering), then the phase-deviation metric tends sharply to zero (an inverted peak).

As a result of the phase deviation search, the method selects the position(s) of the strongest peak(s) to take forward as the candidate translations. Also, it uses the size of the peak, as a phase-deviation metric.

We statistically measured the distribution of phase-deviation metric values for cases where the measured phases do not contain a sampling of the reference signal (with unknown translation), i.e. an un-watermarked signal. We also statistically measured the distribution of phase-deviation metric values for genuinely watermarked content (for affine transforms that yielded correct watermark recovery based on what are to be assumed correct values of translation determined from phase deviation).

These distributions are distinct, but have tails which overlap. From these distributions, a threshold phase-deviation metric value is calculated, and this threshold is used to limit false-positives.

In watermark detector embodiments, false positives at this stage are affine transform candidates of the watermark signal for which a watermark payload decoding will be attempted. More specifically, these are cases where un-watermarked content results in a phase-deviation search yielding a peak stronger than the threshold, resulting in a false positive, and an affine transform is then passed on to attempt demodulation and decoding of the remaining watermark payload.

Use of this threshold for gating can also reduce the number of affine transform candidates where the incorrect phase deviation candidate peak is picked (due to noise in the image or a poor estimate of the linear transform used to sample the phases in the Fourier frequency plane).

Currently, we set this false-positive gating to a ratio of about one in several million. In practice, this false positive rate gets multiplied by the payload decode false-positive rate resulting in something around 1:8 trillion for the watermark detector.

This phase-deviation metric may also be used in conjunction with other metrics to make a more comprehensive classifier for false-positive gating or candidate selection. Other metrics include, but are not limited to, the reference signal magnitude correlation from DLS, or the preceding Linear Transform (or reference signal scale) itself.

Other metrics could include making a requirement that multiple image block candidates all have corroborative multi-dimensional classifier metrics passing an appropriate threshold, including the above mentioned metrics. These metrics are measured for each block and evaluated for consistent classifier result for each block. If consistent across plural blocks, the chance for false classification is reduced substantially. For example, the phase deviation metrics from multiple signal blocks can be used in a multi-dimensional classifier to achieve a vanishingly small false positive rate. In one of our embodiments for watermark signal detection, the phase deviation metric threshold is set such that the false positive rate for un-watermarked marked image blocks exceeding this threshold is 1 in a million image blocks. Assuming independence between image blocks, 3 image blocks each exceeding this threshold is 1 in 10^18 image blocks (10^6×10^6×10^6).

In general, any translation between signals (in N dimensional space) can be recovered using the above phase deviation technology. Additional types of offsets may be determined. One way to extend the application is to convert different types of offsets into translation. One example is rotation and scale in a log polar coordinate system in which the rotation and scale are converted to shifts in the log polar coordinate system. The phase deviation method may also be used for other types of transforms (e.g., again rotation, scale or other linear transform, for example) by incrementing phases in terms of a change or offset in the linear transform parameters (as opposed to just offsets in X and Y).

In addition, while the above description lists particular examples of distance metrics used to measure phase differences, other difference metrics may also be used. Such difference measurements include, but are not limited to, for example, absolute and Euclidean distances, general distance metrics (e.g., Minkowski metric), etc. The phase deviation metric may be expressed as the generalized expression:

$$\{\Sigma_M |f(P_e) - f(P_m)|^r\}^{1/r}$$

$P_e$ and $P_m$ are the estimated and measured phase differences, and the expression provides a generalized form of a phase deviation metric.

Figure 16:
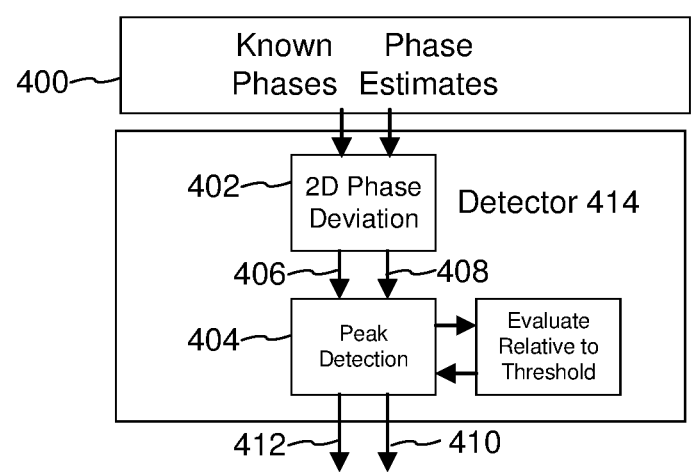
FIG. 16 is a diagram illustrating a phase deviation circuit.

FIG. 16 is a diagram illustrating a phase deviation circuit comprising a memory 400, phase deviation module 402 and peak determination module 404. In particular, the circuit comprises a memory 400 for storing a set of measured phase differences of a suspect signal and known phases of a reference signal. It also comprises a phase deviation module 402 for computing phase deviation metrics 406 for each of the set of known phases of the reference signal and corresponding measured phase differences from the reference signal for candidate offsets 408, the phase deviation metric comprising a deviation between an expected and corresponding measured phase difference, and computing sums of the phase deviation metrics for corresponding candidate offsets. The circuit comprises a peak determination module 404 for determining a candidate offset 410 having a sum of phase deviation metrics 412 indicating a best match between expected and corresponding measured phase differences, wherein the candidate offset associated with the best match is taken as the estimate of an offset between the reference and suspect signals. The circuit further comprises a detector 414 configured to evaluate the sum relative to a threshold to classify a signal. In one embodiment, the detector is configured to evaluate the sum relative to a threshold to detect presence of a reference signal. Further, the detector is configured to evaluate the sum relative to a threshold to detect presence of a digital data carrying signal within the suspect signal.

Though applicable to a wide variety of signal types, the above phase deviation technology is particularly attractive for signals that have sparse representation in the Fourier domain and also for signals that have a subset of dominant values in the Fourier domain. Signals that are not initially sparse in this way may be converted into such sparse form by extracting sparse feature sets and proceeding as above on the sparse feature set.

As noted, phase deviation may be used in synchronization of signals, and specifically in watermark signal synchronization, including in visual and audio signals. There are a myriad of other applications involving matching of signals to each other where phase deviation may be used to derive the offset between signals (signals including patches or blocks of a larger signal).

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations for DLS, phase estimation and phase deviation may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to determine linear transforms, phase shift and translation between signals.

The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions.

The particular combinations of elements and features in the above-detailed embodiments are exemplary only; the interchanging and substitution of these teachings with other teachings in this and the incorporated-by-reference patents/applications are also contemplated.

We claim:

1. A method of determining a geometric transformation of a reference signal in an image, the method comprising:
   providing a linear transform candidate;
   transforming a reference signal with the linear transform candidate to determine locations within the image;

measuring phases of the image at the locations to provide measured phase differences relative to known phases of the reference signal;

for each of plural candidate offsets, obtaining expected phase differences of the reference signal at the candidate offset and computing phase deviations for the expected and corresponding measured phase differences, each of the phase deviations comprising a deviation between an expected and corresponding measured phase difference;

summing the phase deviations for each candidate offset to provide an array of sums corresponding to the candidate offsets; and searching the array of sums to find one or more offset candidates of the array that best approximate the geometric transformation of the reference signal in the image.

2. The method of claim 1 wherein the reference signal comprises a set of signal components, and the expected phase differences correspond to phases of the signal components for a candidate offset.

3. The method of claim 2 wherein the signal components are frequency components and the expected phase differences correspond to phase values of the frequency components after a geometric transformation and at a candidate offset.

4. The method of claim 1 wherein the image includes a version of the reference signal, and the sums are searched to determine the geometric transformation of the version of the reference signal in the image.

5. The method of claim 4 wherein the candidate offset together with rotation, scale, differential scale and shear parameters of the linear transform are used to determine the geometric transformation of the version of the reference signal in the image.

6. The method of claim 4 wherein the reference signal corresponds to a digital watermark signal embedded in the image, and the geometric transformation is used to detect the digital watermark signal in the image.

7. The method of claim 1 wherein the sums are searched to find a peak, which is then evaluated relative to a threshold to classify the image as including the reference signal.

8. The method of claim 1 wherein the sums are searched to detect presence of a watermark signal.

9. The method of claim 1 wherein the reference signal is constructed to have symmetry about an axis, and the reference signal has components that cancel each other when combined in one dimension to create a first 1D signal in a orthogonal dimension; and wherein the array comprises plural 1 dimensional arrays of sums for candidate offsets for the first 1D signal, and the searching comprises searching the 1 dimensional arrays for peaks to get offset candidates for the first 1D signal.

10. A non-transitory computer readable medium, on which is stored instructions, which, when executed by one or more processors, perform a method of determining a geometric transformation of a reference signal in an image, the method comprising:

providing a linear transform candidate;

transforming a reference signal with the linear transform candidate to determine locations within the image;

measuring phases of the image at the locations to provide measured phase differences relative to known phases of the reference signal;

for each of plural candidate offsets, obtaining expected phase differences of the reference signal at the candidate offset and computing phase deviations for the expected and corresponding measured phase differences, each of the phase deviations comprising a deviation between an expected and corresponding measured phase difference;

summing the phase deviations for each candidate offset to provide an array of sums corresponding to the candidate offsets; and searching the array of sums to find one or more offset candidates of the array that best approximate the geometric transformation of the reference signal in the image.

11. The non-transitory computer readable medium of claim 10 wherein the reference signal comprises a set of signal components, and the expected phase differences correspond to phases of the signal components for a candidate offset.

12. The non-transitory computer readable medium of claim 11 wherein the signal components are frequency components and the expected phase differences correspond to phase values of the frequency components after a geometric transformation and at a candidate offset.

13. The non-transitory computer readable medium of claim 10 wherein the image includes a version of the reference signal, and the sums are searched to determine the geometric transformation of the version of the reference signal in the image.

14. The non-transitory computer readable medium of claim 13 wherein the candidate offset together with rotation and scale parameters of the linear transform are used to determine the geometric transformation of the version of the reference signal in the image.

15. The non-transitory computer readable medium of claim 13 wherein the reference signal corresponds to a digital watermark signal embedded in the image, and the geometric transformation is used to detect the digital watermark signal in the image.

16. The non-transitory computer readable medium of claim 10 wherein the sums are searched to find a peak, which is then evaluated relative to a threshold to classify the image.

17. The non-transitory computer readable medium of claim 10 wherein the sums are searched to detect presence of a watermark signal.

18. The non-transitory computer readable medium of claim 10 wherein the reference signal is constructed to have symmetry about an axis, and the reference signal has components that cancel each other when combined in one dimension to create a first 1D signal in a orthogonal dimension; and wherein the array comprises plural 1 dimensional arrays of sums for candidate offsets for the first 1D signal, and the searching comprises searching the 1 dimensional arrays for peaks to get offset candidates for the first 1D signal.

19. A circuit comprising:

a linear transform estimation module for estimating a linear transform of a reference signal in an image;

a transform coordinate module for transforming the reference signal with the linear transform candidate to determine locations within the image;

a phase estimation module for measuring phases of the image at the locations to provide measured phases;

a phase deviation module for generating an array of phase deviation sums corresponding to the measured phases for each of a set of candidate offsets, the phase deviation sums each comprising a sum of deviations between measured phase differences and expected phase differences at a candidate offset; and a peak determination module for searching the array of sums to find one or more top offset candidates of the array that approximate the geometric transformation of the reference signal in the image.

20. The circuit of claim 19 wherein the linear transform estimation module is configured to determine the linear transform by finding a least squares fit between components of the reference signal and image features detected in the image.

* * * * *